(12) United States Patent
Miyazaki et al.

(10) Patent No.: US 6,950,378 B1
(45) Date of Patent: Sep. 27, 2005

(54) LASER POWER CONTROL METHOD AND OPTICAL DISK DEVICE

(75) Inventors: Atsushi Miyazaki, Kyoto (JP);
Hiroyuki Yamaguchi, Hyogo (JP);
Chikashi Inokuchi, Osaka (JP);
Toshiya Akagi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/031,972

(22) PCT Filed: Jul. 28, 1999

(86) PCT No.: PCT/JP00/05127

§ 371 (c)(1),
(2), (4) Date: May 2, 2002

(87) PCT Pub. No.: WO01/08143

PCT Pub. Date: Feb. 1, 2001

(30) Foreign Application Priority Data

Jul. 28, 1999 (JP) .................................. 11-213277

(51) Int. Cl.$^7$ ............................................. G11B 7/125
(52) U.S. Cl. .................................. 369/47.52; 369/53.27
(58) Field of Search ........................... 369/47.5–47.53, 369/53.22, 53.26, 53.27

(56) References Cited

U.S. PATENT DOCUMENTS

| | | | | |
|---|---|---|---|---|
| 4,796,250 A | * | 1/1989 | Kobayashi et al. | ...... 369/53.26 |
| 5,214,626 A | * | 5/1993 | Satoh et al. | ............. 369/30.23 |
| 5,495,463 A | * | 2/1996 | Akagi et al. | ................ 369/116 |
| 5,712,839 A | * | 1/1998 | Aoki | ....................... 369/47.52 |
| 5,805,559 A | * | 9/1998 | Murakami et al. | ......... 369/47.5 |
| 6,333,909 B1 | * | 12/2001 | Zaima | ....................... 369/116 |
| 6,363,047 B1 | * | 3/2002 | Yamashita | .................. 369/116 |

FOREIGN PATENT DOCUMENTS

JP          04-006637        1/1992

(Continued)

OTHER PUBLICATIONS

International Search Report, Application No. PCT/JP00/05127, dated Nov. 13, 2000.

Primary Examiner—Brian E. Miller
Assistant Examiner—Michael V. Battaglia
(74) Attorney, Agent, or Firm—Renner, Otto, Boisselle & Sklar, LLP

(57) ABSTRACT

A laser power control method according to the present invention is a method for controlling an output power of a laser 3 which is used for recording information on a recording medium 1. The method comprises steps of: detecting emitted light of the laser by a first detection section 4; obtaining a first driving current of the laser by a first control section 8 based on an output of the first detection section; detecting reflected light or transmitted light from the recording medium by a second detection section 5; and obtaining a second driving current of the laser by a second control section 12 based on an output of the second detection section. The laser is driven based on the first driving current or the second driving current while the first control section and the second control section are operated alternately such that the second control section does not operate when the first control section is operating, and the first control section does not operate when the second control section is operating. With such a structure, even when a plurality of laser powers which are switched at a high speed are required for recording of information, each laser power can be controlled so as to be an appropriate power for recording of information.

20 Claims, 22 Drawing Sheets

FOREIGN PATENT DOCUMENTS

| | | |
|---|---|---|
| JP | 07-262590 | 10/1995 |
| JP | 10-074330 | 3/1998 |
| JP | 11-073667 | 3/1999 |
| JP | 2000-311372 | 11/2000 |
| JP | 2000-311373 | 11/2000 |
| WO | WO 97/29483 | 8/1997 |

* cited by examiner

FIG. 9

| | Write gate signal | Data gate signal | Output of servo section | Switch |
|---|---|---|---|---|
| Start of apparatus operation | L | L | L | Emitted light control section 8 |
| Recording operation — When passing over header region | L | L | H | Emitted light control section 8 |
| Recording operation — When passing over gap region | H | L | H | Emitted light control section 8 |
| Recording operation — When passing over data region | H | H | H | Reflected light control section 12 |
| Reproduction operation | L | | H | Emitted light control section 8 |
| Off-track | | | L | Emitted light control section 8 |

FIG.12

Input

| α(n) | Pup(n) | INV_Pup(n) |
|---|---|---|
| 1 | 1 | 1 |
| 0.98 | 1.01 | 0.99 |
| 0.96 | 1.02 | 0.98 |
| 0.94 | 1.03 | 0.97 |
| 0.92 | 1.04 | 0.96 |
| 0.9 | 1.05 | 0.95 |
| 0.88 | 1.06 | 0.94 |
| 0.86 | 1.07 | 0.93 |
| 0.84 | 1.09 | 0.91 |
| 0.82 | 1.1 | 0.9 |
| 0.8 | 1.11 | 0.9 |
| 0.78 | 1.13 | 0.88 |
| 0.76 | 1.14 | 0.87 |
| 0.74 | 1.16 | 0.86 |
| 0.72 | 1.17 | 0.85 |
| 0.7 | 1.19 | 0.84 |
| 0.68 | 1.21 | 0.82 |
| 0.66 | 1.23 | 0.81 |
| 0.64 | 1.25 | 0.8 |
| 0.62 | 1.27 | 0.78 |

LASER POWER CONTROL METHOD AND OPTICAL DISK DEVICE

TECHNICAL FIELD

The present invention relates to a laser power control method used with an optical information recording/reproducing apparatus, such as an optical disc apparatus for recording/reproducing information on a recording/reproducing medium (e.g., an optical disc, an optical card, etc.) by using a laser, such as a semiconductor laser or the like. The present invention further relates to such an optical disc apparatus.

BACKGROUND ART

In order to record information on an optical information recording medium, which is typically an optical disc, it is necessary to optimally adjust the emission power of a laser with respect to an information recording surface of the medium. In general, the characteristics of a semiconductor laser, for example, widely varies due to a change in the environmental temperature or the deterioration of the laser itself. Therefore, a control means which is capable of outputting an appropriate power for recording of information on an optical information recording medium according to such characteristic variation is required.

Hereinafter, characteristics of a laser are briefly described by using a semiconductor laser as an example. In the discussion below, the semiconductor laser is used as an example of such a laser.

FIG. 19 shows an I-L characteristic (Injection current—Light intensity characteristic) for temperatures T1 and T2. When driven with a current which is greater than a threshold current Ith, oscillation of the laser begins. Within an oscillation range, the light output per unit driving current increases relative to quantum efficiency $\eta$. In FIG. 19, threshold current Ith0 and quantum efficiency $\eta 0$ for temperature T1, and threshold current Ith1 and quantum efficiency $\eta 1$ for temperature T2 are shown. The threshold current Ith and quantum efficiency $\eta$ change according to a variation in the environmental temperature. Such changes are different among lasers. There is a laser where changes of threshold current Ith and quantum efficiency $\eta$ for temperature T1 are twice as much as those for temperature T2, as shown in an example illustrated in FIG. 19. Thus, the power of an optical output to be emitted is widely changed according to environmental conditions even when a driving current of the laser is the same. Therefore, laser power control is typically achieved by changing a driving current such that the power of an optical output is set to a desired power.

Next, a conventional laser power control method is described with reference to FIG. 20. FIG. 20 illustrates a method for controlling the power of an optical output emitted by a laser so as to be a power suitable for recording on an information recording surface of a medium while monitoring light reflected from the medium.

In FIG. 20, an optical beam output from a laser 201 is reflected by a medium and then received by a light receiving element 202. The light receiving element 202 converts the power of the received optical output to an electric signal, which is output to a calculation section 203. The calculation section 203 compares a reference value stored therein with the output of the light receiving element 202 and calculates, based on the difference therebetween, a driving current where a variation of the laser power is corrected. The calculation section 203 then outputs the calculated driving current to a driving section 204. The driving section 204 drives the laser 201 based on the output of the calculation section 203. As an I-L characteristic of the laser 201 is varied, the power of the optical output emitted by the laser 201 changes. Accordingly, the power of light received by the light receiving element 202 after reflected by the medium also changes. Thus, the output value of the light receiving element 202 changes with respect to the reference value in the calculation section 203. The calculation section 203 adjusts a driving current of the driving section 204 based on a difference between the output value of the light receiving element 202 and the reference value. Due to controlled driving based on the adjusted driving current, the output power of light emitted by the laser 201 is controlled so as to be an appropriate power for recording on the medium.

When dirt, such as dust, fingerprint, etc., is present on the medium, the power of an optical output emitted by the laser 201 is partially scattered or absorbed due to such dirt before the optical output reaches an information recording surface of the medium. Thus, the power of the optical output is insufficient for an appropriate power for recording on the information recording surface of the medium. The power of light reflected by the medium is also insufficient in comparison to a case with no fingerprint or dirt present. The calculation section 203 compares the reference value stored therein with the output of the light receiving element 202 and calculates, based on the difference therebetween, a driving current by which the above insufficiency caused due to dust or dirt is compensated for, and then outputs the calculated driving current to the driving section 204. As a result, the output power of light emitted by the laser is increased. The output power of light is controlled such that the power of light reaching the information recording surface becomes an appropriate power for recording on the medium even when a portion of the power is partially scattered or absorbed by a fingerprint or dirt.

A representative example to which this technique is applied is ROPC (Running Optimum Power Control), which is used when recording information on a write once type optical disc, such as a CD-R or the like. The principles and means of ROPC are described in detail in CD-WO System Description Version 2.0.

The above conventional laser power control means, where an optical output is controlled so as to be at a power suitable for recording information on a medium while monitoring light reflected from a medium (or transmitted light), operates such that a correction is performed considering a power lost due to dust, a fingerprint, etc., with respect to a power optimum on an information recording surface, and an emission power varied due to a change of the I-L characteristic which is caused by a variation in the environmental temperature. That is, in the conventional method, it is not distinguishable whether a variation component of reflected light detected by the light receiving element 202 is a variation component resulting from a change in the I-L characteristic caused by a variation in the environmental temperature or a variation component generated by a fingerprint, or the like, present on the medium. Thus, according to the conventional method, when the power of reflected light is changed due to a change in the I-L characteristic which is caused by a variation in the environmental temperature, and there are a plurality of power values of an optical output which are required for recording information, the plurality of power values cannot be correctly controlled with a small error.

Now, this problem is described more specifically while referring to an example of recording information on a DVD-RAM optical disc.

In a DVD-RAM optical disc, the power of an optical output emitted by a laser used for forming a recording mark has three levels. That is, it is necessary to control the three powers during recording of information on the DVD-RAM optical disc. The three powers are Peak Power, Bias Power 1, and Bias Power 2 which are specified in the DVD Specifications for Rewritable Disk Version 1.0. In the descriptions below, the three powers are represented by abbreviations, Pk, Pb1, and Pb2, respectively.

FIG. 21 shows an example of the three powers emitted by a laser for forming a recording mark. FIG. 21(*a*) is a concept diagram wherein a period when a recording mark is formed is denoted by two levels, HIGH (H) and LOW (L), and the recording mark is formed on the medium during a HIGH (H) period. FIG. 21(*b*) is a concept diagram which illustrates the power of an optical output emitted by the laser during the HIGH (H) period shown in FIG. 21(*a*).

FIG. 21(*b*) shows an example where the three powers, Pk(=11 mW), Pb1(=5 mW), Pb2(=1 mW), are switched at a high speed (switching between Pk and Pb2 is achieved in about 34 ns), while using a reference power Pbase (=0 mW) indicated by a broken line. Although it is necessary to use a high-band receiving element in order to correctly receive the three powers of an optical output reflected by the medium which change at a high speed, such a high-band receiving element is very expensive and accordingly increases the cost of the apparatus. Thus, it is better to use a low-band receiving element in order to suppress an increase in the cost. In this case, the three powers of the optical output reflected by the medium, which are included in the power detected by the receiving element, cannot be divided into each of the three powers.

FIG. 22 shows a variation of a driving current which is necessary for outputting the three powers when the temperature changes from T1 to T2. In FIG. 22, Ith0 denotes a threshold current for temperature T1, and $\eta 0$ denotes a quantum efficiency for temperature T1. Ith1 denotes a threshold current for temperature T2, and $\eta 1$ denotes a quantum efficiency for temperature T2. Pk, Pb1, and Pb2 denote three powers used for recording information on a DVD-RAM disc. Ipk0 denotes a driving current which is necessary to output power Pk when the temperature is T1, Ibs10 denotes a driving current which is necessary to output power Pb1 when the temperature is T1, and Ibs20 denotes a driving current which is necessary to output power Pb2 when the temperature is T1. Ipk1 denotes a driving current which is necessary to output power Pk when the temperature is T2, Ibs11 denotes a driving current which is necessary to output power Pb1 when the temperature is T2, and Ibs21 denotes a driving current which is necessary to output power Pb2 when the temperature is T2. $\Delta$Ipk, $\Delta$Ibs1, and $\Delta$Ibs2 each denote a variation value of the driving current which is used for correcting each power value when the temperature is changed from T1 to T2.

From FIG. 22, the following relationships can be understood:

$$\Delta Ipk = Ipk1 - Ipk0 = (Pk/\eta 1 + Ith1) - (Pk/\eta 0 + Ith0) \quad \text{Expression (1)}$$

$$\Delta Ibs1 = Ibs11 - Ibs10 = (Pb1/\eta 1 + Ith1) - (Pb1/\eta 0 + Ith0) \quad \text{Expression (2)}$$

$$\Delta Ibs2 = Ibs21 - Ibs20 = (Pb2/\eta 1 + Ith1) - (Pb2/\eta 0 + Ith0) \quad \text{Expression (3)}$$

In this example where the power value received by the receiving element for temperature T1 is P0, the power value received by the receiving element for temperature T2 is P1, and the variation rate of P1 to P0 (P1/P0) is $\alpha$, the control means calculates, based on the reflected light, the currents $\Delta$Ipk, $\Delta$Ibs1, and $\Delta$Ibs2 for driving the laser such that a variation rate a obtained based on the variation values of the power is 1, i.e., such that a variation of the power is eliminated.

The following description is based on an assumption that each of $\Delta$Ipk, $\Delta$Ibs1, and $\Delta$Ibs2 can be obtained by using variation value $\Delta$. First, the following definition is given for the variation rate of reflected light which is caused by a variation of Pk:

$$Ipk1/Ipk0 = (Pk/\eta 1 + Ith1)/(Pk/\eta 0 + Ith0) = \alpha pk$$

Based on expression (1), $\Delta$Ipk can be expressed as follows:

$$\Delta Ipk = \alpha pk \times Ipk0 - Ipk0 \quad \text{Expression (4)}$$

Similarly, based on expressions (2) and (3), using $\alpha bs1$ (the variation of reflected light which is caused by a variation of Pb1) and $\Delta bs2$ (the variation of reflected light which is caused by a variation of Pb2), the following expressions can be obtained:

$$\Delta Ibs1 = \alpha bs1 \times Ibs10 - Ibs10 \quad \text{Expression (5)}$$

$$\Delta Ibs2 = \alpha bs2 \times Ibs20 - Ibs20 \quad \text{Expression (6)}$$

Since Pk≠Pb1≠Pb2, the following expression is established:

$$(Pk/\eta 1 + Ith1)/(Pk/\eta 0 + Ith0) \neq (Pb1/\eta 1 + Ith1)/(Pb1/\eta 0 + Ith0) \neq (Pb2/\eta 1 + Ith1)/(Pb2/\eta 0 + Ith0)$$

Therefore, $$\alpha pk \neq \alpha bs1 \neq \alpha bs2 \neq \alpha \text{(a variation rate of reflected light received by the receiving element)} \quad \text{Expression (7)}$$

Even if Pk is obtained from the value of $\alpha$, such a value of a $\alpha$ is inconsistent with the above-established assumption, because the following relationships can be obtained from expressions (4), (5), (6), and (7)

$$\Delta Ipk = \alpha \times Ipk0 - Ipk0$$

$$\Delta Ibs1 \neq \alpha \times Ibs10 - Ibs10$$

$$\Delta Ibs2 \neq \alpha \times Ibs20 - Ibs20,$$

that is, $\Delta$Ibs1 and $\Delta$Ibs2 cannot be obtained by using the variation value $\alpha$.

This means that the control means cannot calculate, based on the reflected light, a driving current which is used for correcting the plurality of powers using a variation value of reflected light detected by the receiving element. Thus, according to the conventional method, there are a plurality of powers to be controlled, and the plurality of powers cannot be controlled with a small error when the power of an optical output emitted by the laser is partially scattered or absorbed by dust, a fingerprint, or the like, and deviated from an appropriate power for recording information on the medium under the circumstance where the environmental temperature changes.

Furthermore, reflected light is sometimes varied regardless of an optimum power for recording information on the medium due to production non-uniformity in the width of recording tracks and in the edge which is generated during production of the medium. In such a case, the power is varied because in the conventional method a variation component is detected by the receiving element, and the driving current is adjusted based on the difference between the detected component and the reference value stored in the calculation section. Accordingly, an error is caused in the power which has been controlled before a variation of reflected light generated due to the aforementioned production non-uniformity is detected.

The present invention was conceived in view of the above circumstances. An objective of the present invention is to provide a laser power control method for controlling a plurality of laser powers that are required for recording so as to be appropriate powers for recording even when the I-L characteristic of the laser is changed due to a variation in the environmental temperature and the laser power reaching a recording surface of a medium is deviated from an appropriate power due to dust, a fingerprint, or the like, or even when light reflected from the medium is varied regardless of an appropriate power for recording, and to provide an optical disc apparatus for performing such control.

DISCLOSURE OF THE INVENTION

A laser power control method of the present invention is a method for controlling an output power of a laser which is used for recording information on a recording medium, comprising steps of:

detecting emitted light of the laser by a first detection section;

obtaining a first driving current of the laser by a first control section based on an output of the first detection section;

detecting reflected light or transmitted light from the recording medium by a second detection section; and obtaining a second driving current of the laser by a second control section based on an output of the second detection section, wherein the laser is driven based on the first driving current or the second driving current while the first control section and the second control section are operated alternately such that the second control section does not operate when the first control section is operating, and the first control section does not operate when the second control section is operating. With this structure, the above objective can be achieved.

The first control section operates when reproduction information data is not recorded or reproduced.

In the recording medium, a region where data is to be recorded is divided into sectors; and when a laser irradiation position is within a gap region where recording/reproduction of data is not to be performed within the sectors, the first control section operates.

The first control-section performs a calculation for obtaining an I-L characteristic which represents a relationship between a driving current and an optical output of the laser: and the first driving current is obtained based on the I-L characteristic.

In one embodiment, the laser power control method further comprises a step of obtaining the second driving current based on an output of the second detection section, the I-L characteristic obtained by the first control section, and appropriate laser power stored in an apparatus by the second control section.

In one embodiment, when the first control section operates after the second control section has operated, and then the second control section is operated again, the second control section operates based on an output of the second detection section which was obtained immediately before the operation of the previously-operated first control section.

In one embodiment, an operation of the second control section is stopped in a region where it is previously known that no defect exists; and the second control section uses an output of the second detection section obtained when the first control section is operated as a reference so as to drive the laser according to an output variation in the second detection section with respect to the reference.

In one embodiment, a movement section for moving a laser irradiation position on the recording medium is used; an operation of the second control section is stopped when the laser irradiation position is moved by the movement section; an output of the second detection section obtained when the first control section is operated is obtained again as a reference; and the second control section is operated after the reference has been obtained.

In one embodiment, when the reference is obtained again, a value obtained from the output of the second detection section which is output after the laser irradiation position is moved by the movement section and before the laser irradiation position reaches a recording target position, is obtained as the reference.

In one embodiment, an output of the first control section is changed when a speed at which emitted light of the laser scans the recording medium is varied, a reference is changed based on the varied value.

In one embodiment, the recording medium is a body of revolution; a varied value for the output of the second detection section is maintained to be the same value even after the time required for rotation of the recording medium or more has elapsed; and if the value exceeds a predetermined value, the output of the first control section is changed such that the output of the second detection section is within a range defined by the predetermined value.

Another laser power control method of the present invention is a laser power control method comprising steps of: detecting reflected light or transmitted light from a recording medium by a detection section; driving a laser by a control section according to an output of the detection section; and the output of the detection section is corrected according to an output of the control section. With this structure, the above objective can be achieved.

When the output of the detection section is corrected, the detection section delays the start of correction by the time required for detecting reflected light or transmitted light from the recording medium.

More preferably, the start of correction is delayed by utilizing a phase delay characteristic of a low pass filter.

In one embodiment, table data including a plurality of output values of the control section that are identified by addresses, which are corresponding output values of the detection section, is employed; the control section selects data which is identified by an address in the vicinity of an output value of the detection section and outputs the selected data; an output of the detection section which is output when an emission limit of the laser is exceeded is previously calculated as a maximum output value before the control section is operated; the address corresponding to the maximum output value is used as a selectable maximum address; and when data which is selected when the control section is operated is an address equal to or greater than the maximum address, the output of the control section is clipped with data represented by the maximum address.

In one embodiment, the table data includes first table data which corresponds to the output of the control section and second table data which represents a correction to the output of the detection section; and the second table data is formed by corrected values with respect to an output error generated by rounding because of a limited word length of the first table data.

In one embodiment, when a laser irradiation position on the recording medium is shifted from a recording position, the control section changes an output of the laser so as to be equal to or smaller than a power appropriate for erasing data; when the laser irradiation position returns to the recording position, an output of the laser is changed to a previously-employed output.

When the laser irradiation position is within the gap region, the laser performs test emission while changing the power at a low speed, in comparison to emission performed while changing the power at a high speed which is suitable for recording of data.

An optical disc apparatus of the present invention is an optical disc apparatus for recording/reproducing information on an optical disc by using a laser, comprising:
- a first detection section for detecting emitted light of the laser;
- a first control section for obtaining a first driving current of the laser based on an output of the first detection section, and outputting the obtained first driving current;
- a second detection section for detecting reflected light or transmitted light from the optical disc;
- a second control section for obtaining a second driving current of the laser based on an output of the second detection section, and outputting the obtained second driving current;
- a selection section for selecting one of the outputs of the first and second control sections as a driving current for driving the laser; and
- a driving section for driving the laser based on the selected driving current,
- whereby recording of information can be performed with an appropriate laser power. With this structure, the above objective can be achieved.

The first control section is structured so as to obtain an I-L characteristic which represents a relationship between a driving current and an optical output of the laser based on the output of the first detection section and outputs the obtained I-L characteristic.

The second control section is structured so as to obtain the second driving current based on the output of the second detection section, the I-L characteristic, and the appropriate laser power stored in the apparatus.

BRIEF DESCRIPTION OF THE DRAWINGS

FIG. 9 illustrates a switching operation of the switch of the optical disc apparatus of FIG. 2.

FIG. 12 shows table data which describes processing in a digital signal processing circuit of the reflected light control section of FIG. 5.

BEST MODE FOR CARRYING OUT THE INVENTION

Figure 1:
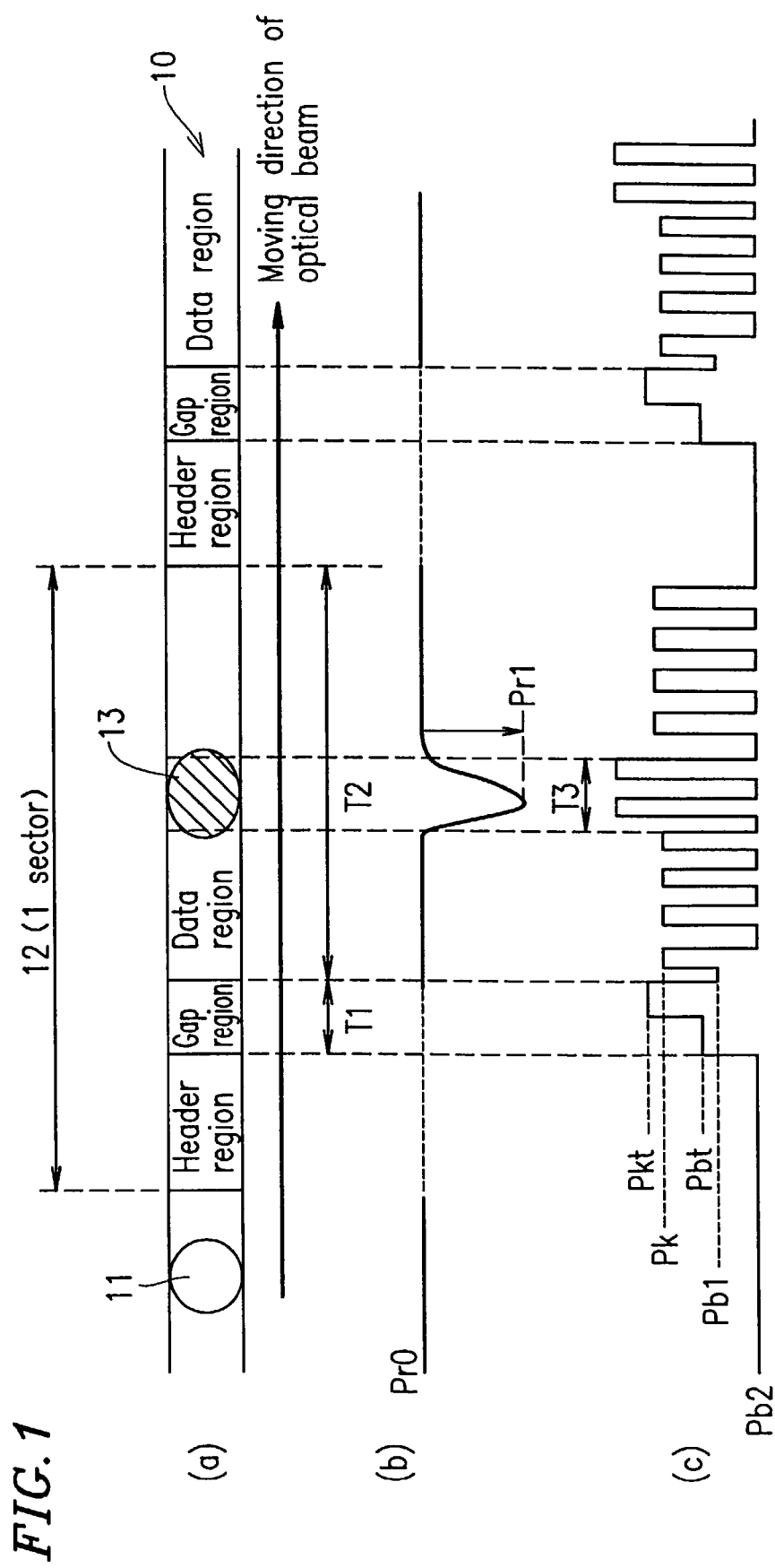
FIG. 1 illustrates a principle of a laser power control method of the present invention. Section (a) shows a structure of a track on an optical disc. Section (b) is a timing chart showing a variation of the power of light reflected from the optical disc which is detected by a receiving element in an optical disc apparatus during scanning of the track shown in section (a) by an optical beam. Section (c) is a timing chart schematically showing a level variation of the laser power of a laser which is controlled according to a laser power control method of the present invention.

First, the basic concept of the present invention is described.

A laser power control method according to the present invention is achieved by a combination of control means for emitted light (first control section) which is incorporated in an optical disc apparatus and control means (second control section) for reflected light. The control means for emitted light controls the laser power by directly monitoring light emitted by a laser used for recording. The control means for reflected light controls the laser power based on light reflected from an optical disc. The control means for emitted light obtains an I-L characteristic (Injection current—Light intensity characteristic) which indicates the relationship between a driving current and an optical output of the laser at a specific environmental temperature. Based on the obtained I-L characteristic, the laser driving current is adjusted so as to obtain a appropriate laser power (appropriate power) which affects a recording surface of a recording medium for correctly recording information on the recording surface of the recording medium. The control means for reflected light obtains a laser driving current by which a loss of the laser power with respect to the appropriate power, which is caused when a defect such as dust, a fingerprint, etc., is present on the optical disc, is compensated for.

In the present invention, the control means for emitted light and the control means for reflected light do not operate simultaneously but alternately. That is, they are structured such that when the control means for emitted light operates, the control means for reflected light does not operate, and when the control means for reflected light operates, the control means for emitted light does not operate.

More specifically, the control means for emitted light operates when a laser optical beam is within an area other than data region on a track of the optical disc in which reproduction information data is recorded. In the meantime, the laser performs a test emission while switching the laser power at a low speed. By detecting the laser power of the test emission, the above I-L characteristic and a corrected laser driving current capable of generating an appropriate power required for recording information can be obtained. The thus-obtained laser driving current is hereinafter referred to as a primary corrected laser driving current (first driving current).

On the other hand, the control means for reflected light operates when a laser optical beam is within a data region on a track of the optical disc in which reproduction information data is recorded. In the meantime, the laser performs a recording emission with the power switching at a high speed suitable for recording of information. With this recording emission, the control means for reflected light obtains a laser power driving current such that when a power loss is generated in the laser power determined based on the primary corrected laser driving current due to a defect present on the optical disc, the loss can be compensated for, i.e., a laser power driving current such that a laser power which contributes to recording of information on the optical disc is at a sufficient and appropriate level required for recording information. The thus-obtained laser driving current is hereinafter referred to as a secondary corrected laser driving current (second driving current).

By driving the laser using the primary corrected laser driving current or secondary corrected laser driving current, each of a plurality of laser powers which contribute to recording of information on the optical disc is maintained at an appropriate level which is necessary for recording the information. According to the present invention, different control means (the control means for emitted light and the control means for reflected light) are respectively used for compensating for a variation in the laser power due to a change in the I-L characteristic which is caused by a variation in the environmental temperature and a power loss which is caused by a defect on an optical disc, so as to control the output power of a laser. With such an arrangement, in comparison to the conventional laser power control method, the accuracy and reliability of control where a plurality of levels of the power which are switched at a high speed are controlled is increased.

Hereinafter, a principle of a laser power control method according to the present invention is described with reference to FIGS. 1(a) to 1 (cIn a ).

FIG. 1(a) schematically shows a structure of a track 10 on an optical disc (not shown) and a transition of an optical beam 11 of a laser along the track 10 which is achieved by turning of the optical disc. The track 10 is uniformly divided by units of a sector (12). The sector 12 has an address region (header region) at the head thereof where an address for identifying the sector 12 is recorded. The sector 12 further has a data region for recording reproduction data after the head region. Immediately after the header region, i.e., between the header region and the data region, there is provided a gap region where no data to be reproduced exists or is recorded. FIG. 1(a) shows an example where a defect 13, e.g., dirt, such as a fingerprint, dust, etc., is present in the data region.

FIG. 1(b) is a timing chart showing a variation of the power of light reflected from the optical disc which is detected by a receiving element in an optical disc apparatus during scanning of the track shown in FIG. 1(a) by an optical beam 11. If there is the defect 13 is present in the data region, when the optical beam 11 passes over the defect 13, the power of the reflected light decreases from level Pr0 to level Pr1.

FIG. 1(a) is a timing chart schematically showing a level variation of the emitted power (laser power) of a laser which is controlled according to a laser power control method of the present invention. A vertically-running broken line in these drawings indicates a temporal synchronization relationship between a position of the optical beam 11 over each of the regions shown in FIG. 1(a) and the timing chart for the reflected light of FIG. 1(b) and the timing chart for the laser power of FIG. 1(c).

Figure 19:
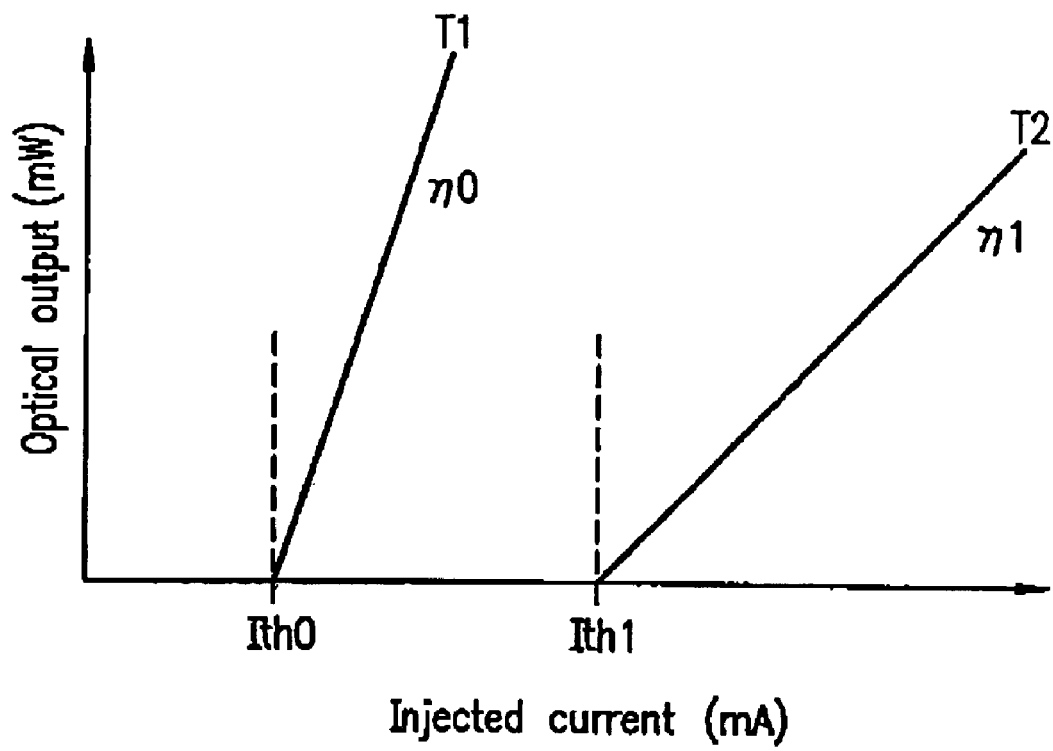
FIG. 19 illustrates an I-L characteristic of a laser.
Figure 20:
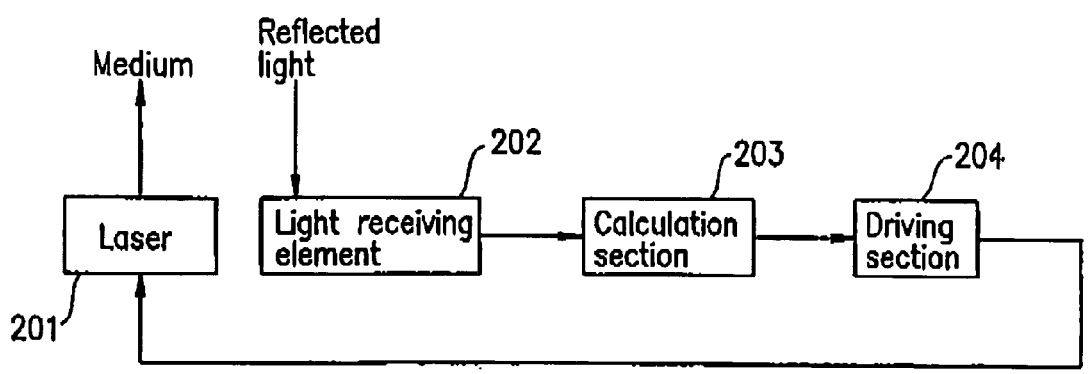
FIG. 20 is a block diagram showing an exemplary structure of a conventional control section which operates based on reflected light.
Figure 21:
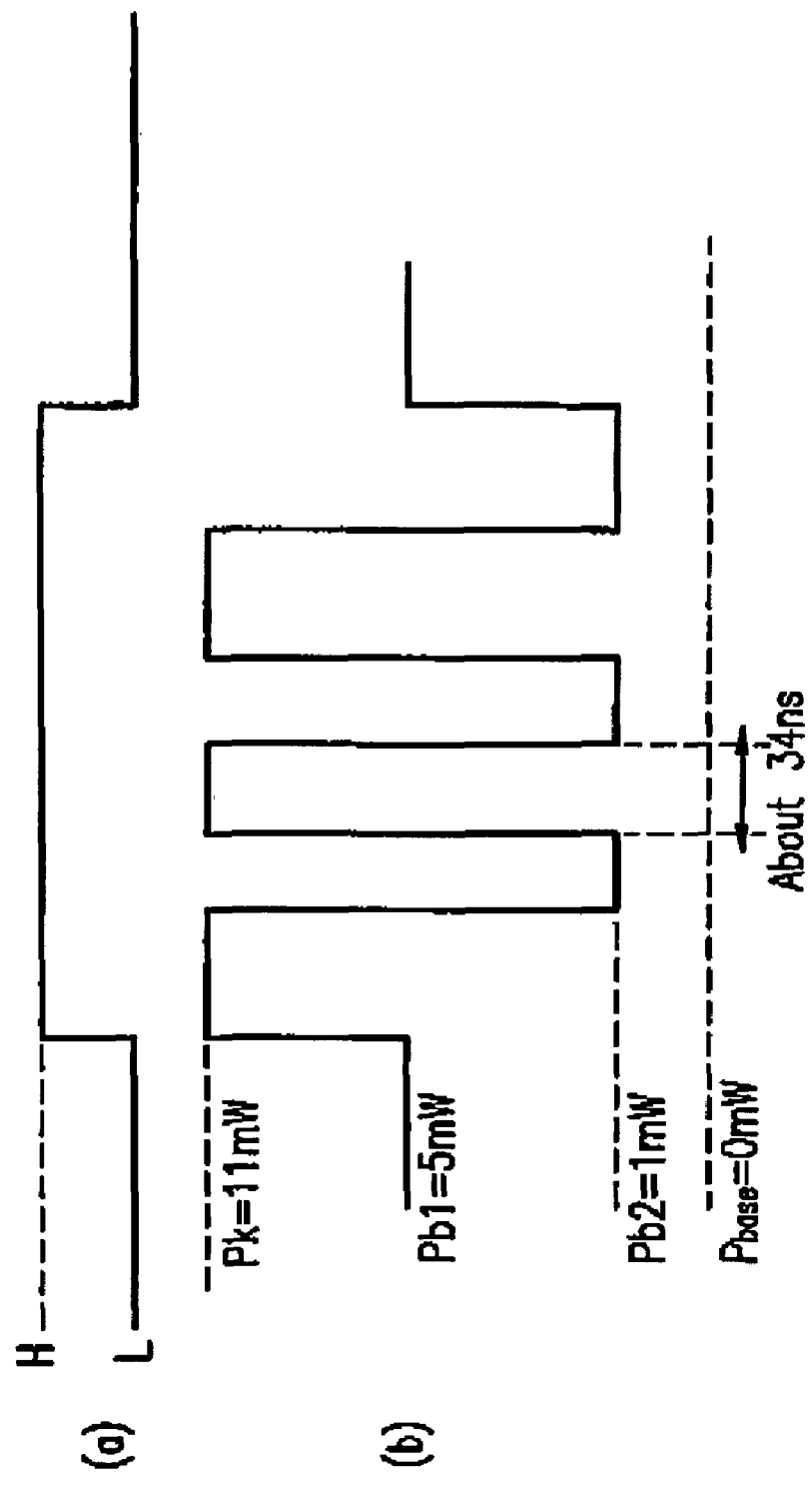
FIG. 21 shows the power output from the laser during formation of a recording mark.
Figure 22:
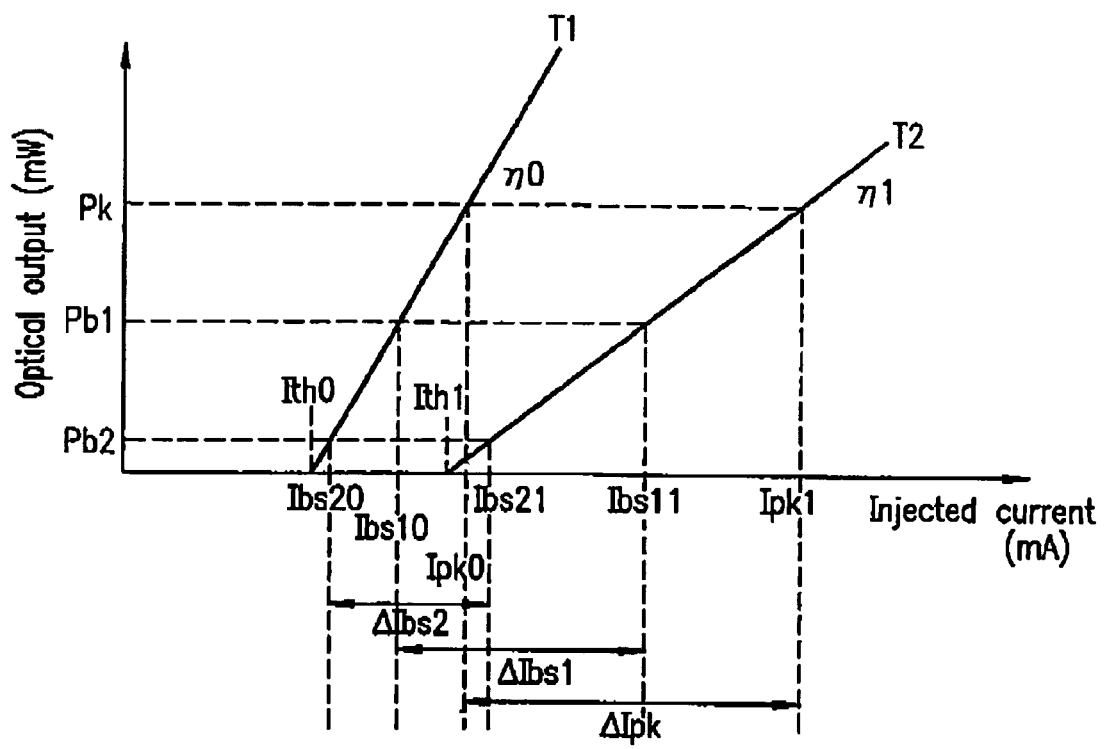
FIG. 22 illustrates a method for controlling a plurality of powers by using the I-L characteristic.

As shown in FIG. 1(c), during period T1 when the optical beam 11 passes over the gap region, the laser performs a test emission while switching the laser power at a low speed. During period T1, the control means for emitted light operates. In the meantime, the control means for reflected light does not operate during period T1. In this test emission (in the example illustrated in FIG. 1(c)), light is emitted at the two powers, power Pkt and power Pbt. The I-L characteristic, i.e., the quantum efficiency η and threshold current Ith (see FIG. 19), of the laser can be obtained from the following expressions:

$$\eta = (Pkt - Pbt)/(Ipkt - Ipbt) \qquad \text{Expression (a)}$$

$$Ith = Ipbt - Pbt/\eta \qquad \text{Expression (b)}$$

where Ipkt denotes a driving current of the laser when outputting power Pkt, and Ipbt denotes a driving current of the laser when outputting power Pbt. Based on the obtained quantum efficiency η and threshold current Ith, a driving current corresponding to a laser power required for recording information (primary corrected laser driving current) can be calculated according to a variation of the I-L characteristic which is caused by an environmental temperature variation from the following expressions:

$$Ipk(\text{primary}) = Pk/\eta + Ith \qquad \text{Expression (c)}$$

$$Ibs1(\text{primary}) = Pb1/\eta + Ith \qquad \text{Expression (d)}$$

$$Ibs2(\text{primary}) = Pb2/\eta + Ith \qquad \text{Expression (e)}$$

Since a test emission is performed while switching the laser power at a low speed in order to obtain the primary corrected laser driving current, in place of performing laser emission with the power switching performed at a high speed, an optical detector which operates at a low response speed may be used for directly monitoring the power output by the laser. Thus, it is not necessary to use an optical detector which operates at a high response speed, and accordingly, an increase in the cost of an optical disc apparatus can be avoided.

In FIG. 1, the test emission is performed during a period when the optical beam passes over the gap region shown in FIG. 1(a), but the present invention is not limited thereto. When a recording medium which does not have a gap region is used, a region of the medium in which data other than effective data, i.e., data other than data which is to be reproduced after being recorded, can be recorded may be accessed to perform a test emission. For example, when a DVD-RAM optical disc is used, the control means for emitted light is periodically operated while accessing a region called "drive test zone". In such a way, the present invention can be applied to a medium which does not have a gap region on a recording track.

In the example illustrated in FIG. 1, the test emission is performed with the two powers (power Pkt and power Pbt), but the present invention is not limited thereto. It is understood that the primary corrected laser driving current can be obtained by performing a test emission with the three or more powers. It should be noted that, considering that an optical detector with a lower response speed is preferably used for monitoring an output from the laser, a test emission with two powers is most economical.

After period T1 for the test emission has elapsed, the optical beam 11 enters the data region. During period T2 when the optical beam 11 passes over this region, the operation of the control means for emitted light is stopped, whereas the control means for reflected light is operated instead. During period T2, the laser performs emission such that three powers (Pkt, Pb1, and Pb2) are switched at a high speed as shown in FIG. 1(c) for correctly recording information. The three powers are determined based on the primary corrected laser driving current obtained by the control means for emitted light.

As mentioned with respect to FIGS. 1(a) and 1(b), when the optical beam 11 passes over the defect, e.g., dust, a fingerprint, etc., which is present in the data region, the optical output power of the laser is partially scattered or absorbed by this defect and deviates from an appropriate power for recording information on the optical disc. As a result, the power of light reflected from the optical disc decreases from power Pr0 (which is obtained when no defect is present) to power Pr1. On the other hand, in the present invention, the control means for reflected light detects a loss in level of the power of reflected light which is caused due to the defect during period T3 when the optical beam 11 passes over the defect 13, and this loss is compensated for based on the I-L characteristic obtained by the control means for emitted light during period T1. In this way, a secondary corrected laser driving current is obtained.

Thus, correction of the laser driving current which is achieved by the control means for reflected light is performed after correction for a variation of the laser power caused due to a variation of the I-L characteristic of the laser, which may be caused due to a variation in the environmental temperature, has been completed. Therefore, it is understood that a variation of the power of reflected light in the secondary correction which is performed by the control means for reflected light results from only the loss of power which is caused by a defect such as dust, a fingerprint, etc. Thus, the proportion of the power loss which is caused by a defect, i.e., a ratio between the power of reflected light, Pr1, which is obtained when a defect is present and the power of reflected light, Pr0, which is obtained when a defect is not present (reflected light power variation rate (denoted by "α'")), is the same for each of the three powers (Pkt, Pb1, Pb2). The control means for reflected light obtains secondary corrected laser driving currents (Ipk(secondary), Ibs1 (secondary), Ibs2 (secondary)) corresponding to the three powers (Pkt, Pb1, Pb2) which are appropriate for correctly recording information, by performing the following calculations using the reflected light power variation rate α', and the quantum efficiency η (expression (a)) and threshold current Ith (expression (b)) which are obtained during the operation of the control means for emitted light in period T1

$$Ipk(\text{secondary})=(Pk/\eta+Ith)/\alpha' \quad \text{Expression (f)}$$

$$Ibs1(\text{secondary})=(Pb1/\eta+Ith)/\alpha' \quad \text{Expression (g)}$$

$$Ibs2(\text{secondary})=(Pb2/\eta+Ith)/\alpha' \quad \text{Expression (h)}$$

According to a method of the present invention, the three secondary corrected laser driving currents are more accurate values with a small error, in comparison to the conventional method. By using such laser driving currents, control of the laser power can be achieved in a more accurate manner.

This embodiment of the present invention relates to control of the laser power with which recording of information is performed on an optical disc, but the present invention is not limited thereto. The present invention can be applied to laser power control for recording/reproduction of information for other recording medium on which recording/reproduction of information is performed by using a laser, e.g., an optical card or the like.

In the description of the embodiment of the present invention, correction of the loss in the laser power which is caused by a defect on the recording medium is performed by using the control means for reflected light (second control section) which utilizes light reflected from the recording medium. However, it is readily understood that the present invention can be applied to an optical information recording/reproduction apparatus which performs reproduction of information by using light transmitted through the recording medium. In this case, control means for transmitted light forms a second control section, in place of the control means for reflected light, although the structure and function of the second control section are the same.

Figure 2:
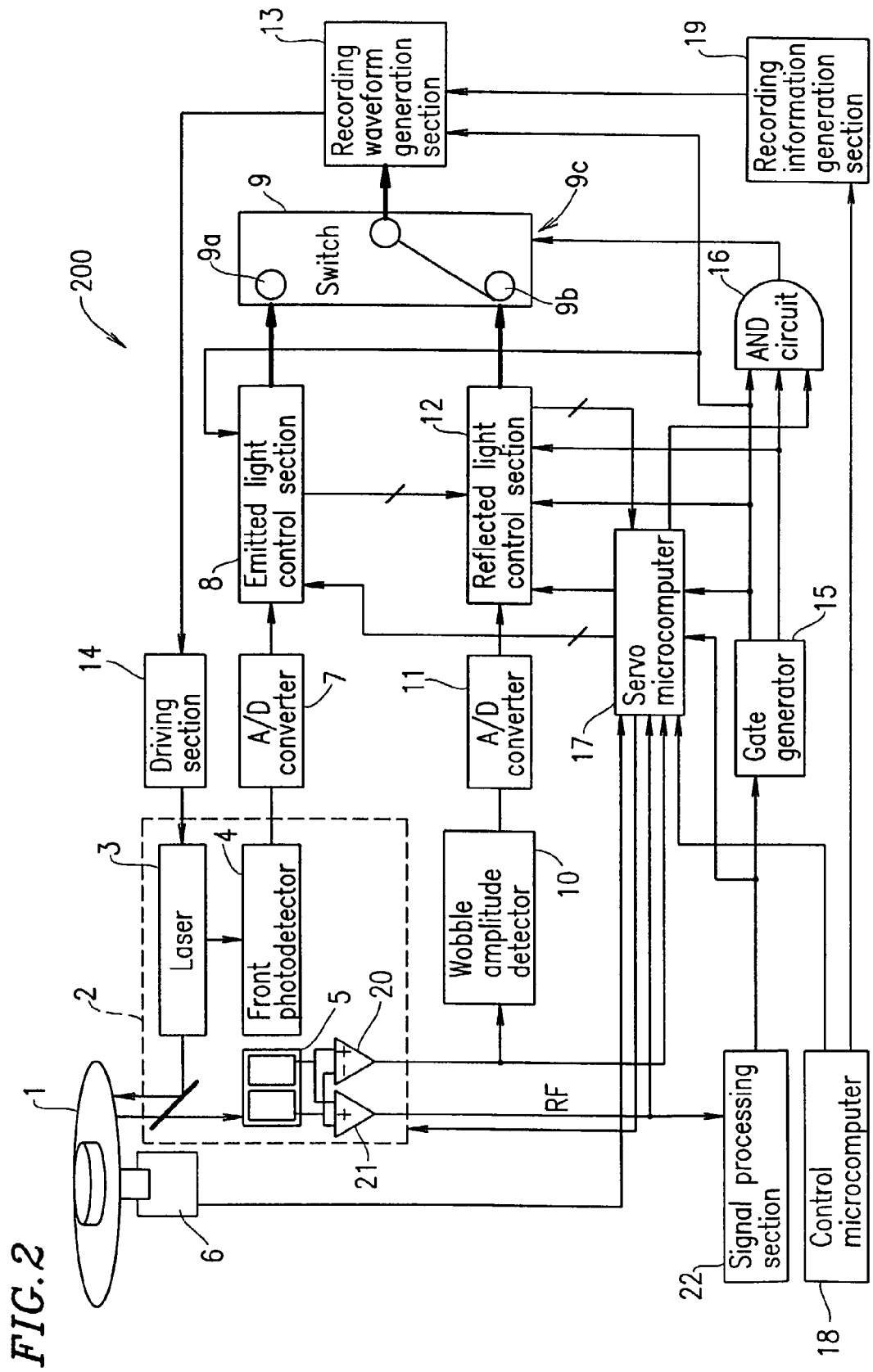
FIG. 2 is a block diagram showing a structure of an embodiment of an optical disc apparatus according to the present invention.

Hereinafter, an embodiment of an optical disc apparatus which carries out the above-described laser power control method is described. FIG. 2 generally shows a structure of an embodiment of an optical disc apparatus 200 according to the present invention.

The optical disc apparatus 200 performs recording/reproduction of information with a pickup 2 on an optical disc 1. The pickup 2 includes a laser 3, a front photodetector 4 for receiving an optical beam output from the laser 3 and converting the power of the received optical beam to an electric signal, and a photodetector 5 for receiving an optical beam output from the laser 3 and reflected from the optical disc 1 and converting the power of the received optical beam to an electric signal. The pickup 2 is attached to a transfer table (moving section) capable of moving in the radius direction of the optical disc 1 based on a control instruction which is input from a servo microcomputer 17 (described later). The transfer table helps an operation of gathering an optical beam output from the laser 3 through an objective lens (not shown in FIG. 2) on a track formed on the optical disc 1.

The optical disc 1 has a plurality of tracks running in the radius direction formed thereon. The tracks are divided into sectors 12, each of which is a unit for recording data (see FIG. 1(a)). Each sector has an address region (header region) at the head thereof where an address for identifying the sector is recorded. The sector 12 further has a data region for recording reproduction data after the head region. Immediately after the header region, i.e., between the header region and the data region, there is provided a gap region where no data to be reproduced exists or is recorded. The optical disc 1 is rotated by a motor 6 at a predetermined speed. Data is recorded on the optical disc 1 according to the power of an optical beam output from the pickup 2.

The front photodetector 4 converts the power of the optical beam received from the laser 3 to an electric signal and outputs the electric signal to an A/D converter 7. The A/D converter 7 converts the analog signal from the front photodetector 4 to a digital signal and outputs the digital signal to an emitted light control section 8. The emitted light control section 8 forms the above-described laser power control means for emitted light (control means for emitted light) of the present invention. The emitted light control section 8 obtains a desired electric currents for driving the laser 3, Ipk, Ibs1, Ibs2, or Ird (primary corrected laser driving current) according to the output of the front photodetector 4 which is input through the A/D converter 7, such that the power of the optical beam is equal to a corresponding one of the three powers (Pk, Pb1, Pb2) which are used for recording information on the optical disc 1 and reproduction power Pr for reproducing information on the disc 1, which are stored in a memory of the emitted light control section 8. Then, the emitted light control section 8 outputs the obtained, desired electric current to an input terminal 9a of a switch 9. The emitted light control section 8 obtains values of threshold current Ith and quantum efficiency η for the laser 3 and outputs the obtained values to a reflected light control section 12 (described later). The values of the three powers (Pk, Pb1, Pb2) and the reproduction power Pr which are stored in a memory of the emitted light control section 8 can be set by the servo microcomputer 17 (described later).

The photodetector 5 which receives reflected light from the optical disc 1 has, for example, a two-division structure. Outputs of the two divisions are input to a differential amplifier 20 and an adder 21. The adder 21 adds two input signals and outputs the added signal. An output of the adder 21 is input, as an RF signal which indicates information recorded in the optical disc 1, to a signal processing section 22 and the servo microcomputer 17. The differential amplifier 20 outputs a difference of the two input signals. The signal output from the differential amplifier 20 is input to the servo microcomputer 17 and a wobble amplitude detector 10 as a tracking error signal to be used for tracking control which is performed to allow an optical beam to follow a track.

The wobble amplitude detector 10 extracts from the input tracking error signal a certain frequency component at which a track on the optical disc 1 wobbles, and outputs to the A/D converter 11 a wobble amplitude signal where an envelope is detected. The A/D converter 11 converts the signal input from the wobble amplitude detector 10, from analog to digital, and outputs the converted signal to the reflected light control section 12. The reflected light control section 12 forms the above-described laser power control means for reflected light (control means for reflected light) of the present invention. The reflected light control section 12 detects the value of a variation in the output of the wobble amplitude detector 10 which is input through the A/D converter 11 with respect to a value output from an internal amplifier (not shown in FIG. 2). The reflected light control section 12 obtains an electric current for driving the laser 3, Ipk, Ibs1, and Ibs2 (secondary corrected laser driving current), based on the values of the threshold current Ith and quantum efficiency η which are input from the emitted light control section 8, and outputs the obtained electric current to an input terminal 9b of the switch 9. An output of the above amplifier is input to the servo microcomputer 17. The servo microcomputer 17 changes the amplification factor of the amplifier according to the information input from the amplifier, and outputs the changed value to the reflected light control section 12.

The switch 9 selects one of the emitted light control section 8 and the reflected light control section 12 according to a two-value input (high (H) or low (L)) from a control terminal 9c, and outputs an output of the selected section to a recording waveform generation section 13. The recording waveform generation section 13 switches, based on a control signal input from a recording information generation section 19 and a gate signal input from a gate generator 15, the four driving current values, Ipk, Ibs1, Ibs2, and Ird, which are input through the switch 9, and outputs the switched driving current value to a driving section 14. The driving section 14 drives the laser 3 based on the input current value.

The RF signal from the photodetector 5 is also input to the signal processing section 22. The signal processing section 22 is a circuit for reproducing, based on the RF signal, data recorded on the optical disc 1. The signal processing section 22 reproduces an address for identifying a sector of the optical disc 1 and outputs the reproduced address to the servo microcomputer 17 and the gate generator 15. The gate generator 15 detects the position of an optical beam within a sector by counting the number of edges of a reference clock (29.2 MHz for a DVD-RAM optical disc having a capacity of 2.6 Gbytes on one surface) which is used for recording/reproduction of information, and outputs two types of gate signals according to the detected position and the address input from the signal processing section 22. Details of the two types of gate signals will be described later with reference to FIG. 8. One of the gate signals is a write gate signal which is high (H) when the optical beam is within an area other than an address region (header region) of a sector in which data is recorded. The other gate signal is a data gate signal which is high (H) when the optical beam is within an area of a sector in which data can be recorded (data region). The write gate signal is input to the emitted light control section 8, the reflected light control section 12, the servo microcomputer 17, an AND circuit 16, and the recording waveform generation section 13. The data gate signal is input to the reflected light control section 12 and the AND circuit 16. The AND circuit 16 outputs to the control terminal 9c of the switch 9 a signal of a logical product of the write gate signal, the data gate signal, and an output signal of the servo microcomputer 17. In the present specification, the AND circuit 16 and the switch 9 form a selection section for selecting one of the outputs of the emitted light control section 8 (first control section) and the reflected light control section 12 (second control section) as a driving current for driving the laser.

The servo microcomputer 17 (not shown in FIG. 2) receives a focus error signal output from the pickup 2 and performs focusing control so as to control the position of an objective lens of the pickup 2 such that the optical beam converges on the information recording surface of the optical disc 1. The servo microcomputer 17 further performs tracking control so as to allow the position of the optical beam to follow the track according to the tracking error signal input from the differential amplifier 20. The servo microcomputer 17 performs seek control so as to output a control signal to the pickup 2, based on a control signal input from a control microcomputer 18 and an address input from the signal processing section 22 for identifying a sector through which the optical beam is currently passing, such that the pickup 2 is moved in a radius direction of the optical disc 1 to move the position of the optical beam. The servo microcomputer 17 performs spindle motor control wherein the servo microcomputer 17 receives from the motor 6 rotation speed information for the optical disc 1 and drives the motor 6 based on the received information so as to rotate the optical disc 1 at a predetermined speed. Furthermore, the servo microcomputer 17 outputs to the reflected light control section 12 a value for switching the amplification factor for an amplifier in the reflected light control section 12 which is determined according to an output of the amplifier in the reflected light control section 12, an RF signal input from the photodetector 5, and the H/L level of the write gate signal input from the gate generator 15. The servo microcomputer 17 monitors the rotation speed of the motor 6, the level of the tracking error signal, and the output of the amplifier in the reflected light control section 12, and outputs to the emitted light control section 8 set values for a memory incorporated in the emitted light control section 8 based on the conditions inside the servo microcomputer 17. Furthermore, the servo microcomputer 17 outputs to the AND circuit 16 a forced outage signal for forcedly pulling the output of the AND circuit 16 to the L level. Effects of the operations of the servo microcomputer 17 will be described later in detail.

The control microcomputer 18 outputs to the servo microcomputer 17 an instruction to move the pickup 2 and transmits to the recording information generation section 19 data to be recorded on the optical disc 1. In order to form a recording mark to be recorded on the optical disc 1 based on recording data transmitted from the control microcomputer 18, the recording information generation section 19 outputs to the recording waveform generation section 13 a control signal which directs a timing for switching at the recording waveform generation section 13 the three driving current values, Ipk, Ibs1, and Ibs2, which are output via the switch 9 and a driving current to be selected.

Figure 3:
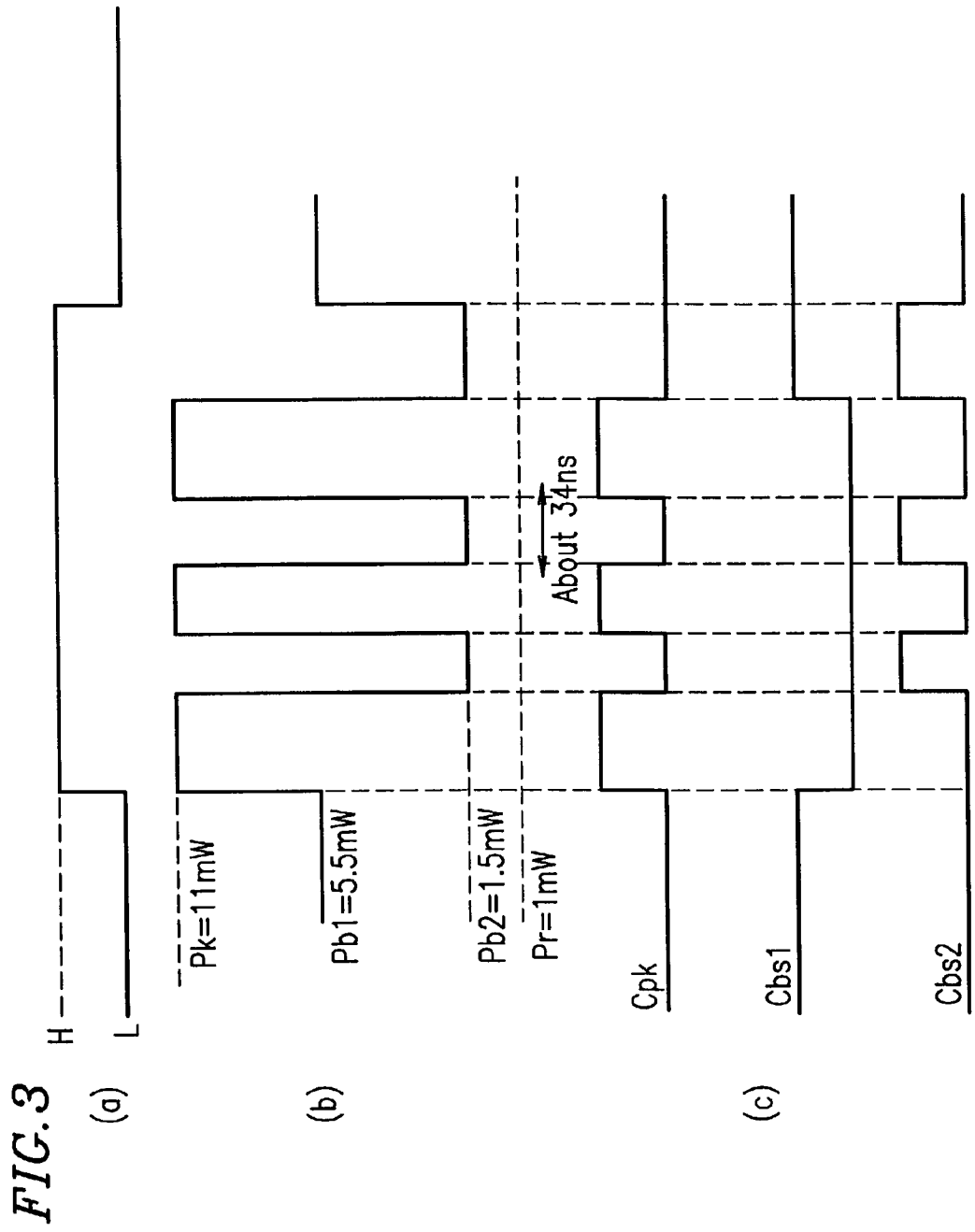
FIG. 3 illustrates an operation of a recording information generation section of the optical disc apparatus of FIG. 2.

FIG. 3 shows a relationship between a control signal output from the recording information generation section 19 and the current value selected in the recording waveform generation section 13. FIG. 3(a) is a conceptual diagram in which the period when a mark to be recorded on the optical disc 1 is formed is expressed by two levels, H and L. The recording mark is formed on the optical disc 1 during the H level period. FIG. 3(b) is a conceptual diagram showing the power of the optical beam output from the laser 3 during the H level period shown in FIG. 3(a). In the drawings, the power for reproduction, Pr, is shown by a broken line of 1 mW. When a recording mark is formed, the three powers Pk=11 mW, Pb1=5.5 mW, and Pb2=1.5 mW, which are shown above the broken line of 1 mW, are output. FIG. 3(c) shows control signals Cpk, Cbs1, and Cbs2 transmitted from the recording information generation section 19 to the recording waveform generation section 13, based on which the timing for switching the three driving currents Ipk, Ibs1, and Ibs2 at the recording waveform generation section 13 and a driving current to be selected are determined, such that the power of the optical beam output from the laser 3 is changed as shown in FIG. 3(b). When the control signals Cpk, Cbs1, and Cbs2 are at H level, corresponding currents Ipk, Ibs1, and Ibs2 are selected, respectively. Switching of the level of each of the signals Cpk, Cbs1, and Cbs2 shown in FIG. 3(c) is achieved very quickly. Especially, the signals Cpk and Cbs2 are switched to the H level with an interval of about 34 ns. Since the front photodetector 4 used herein is a light receiving element capable of converting a power to an electric signal by units of about 500 ns, it is impossible to identify each of the three powers of the optical beam output from the laser 3 during the formation of a recording mark. The photodetector 5 also cannot identify the three powers of the optical beam reflected by the optical disc 1, and the output thereof is a general average of the three powers.

Figure 4:
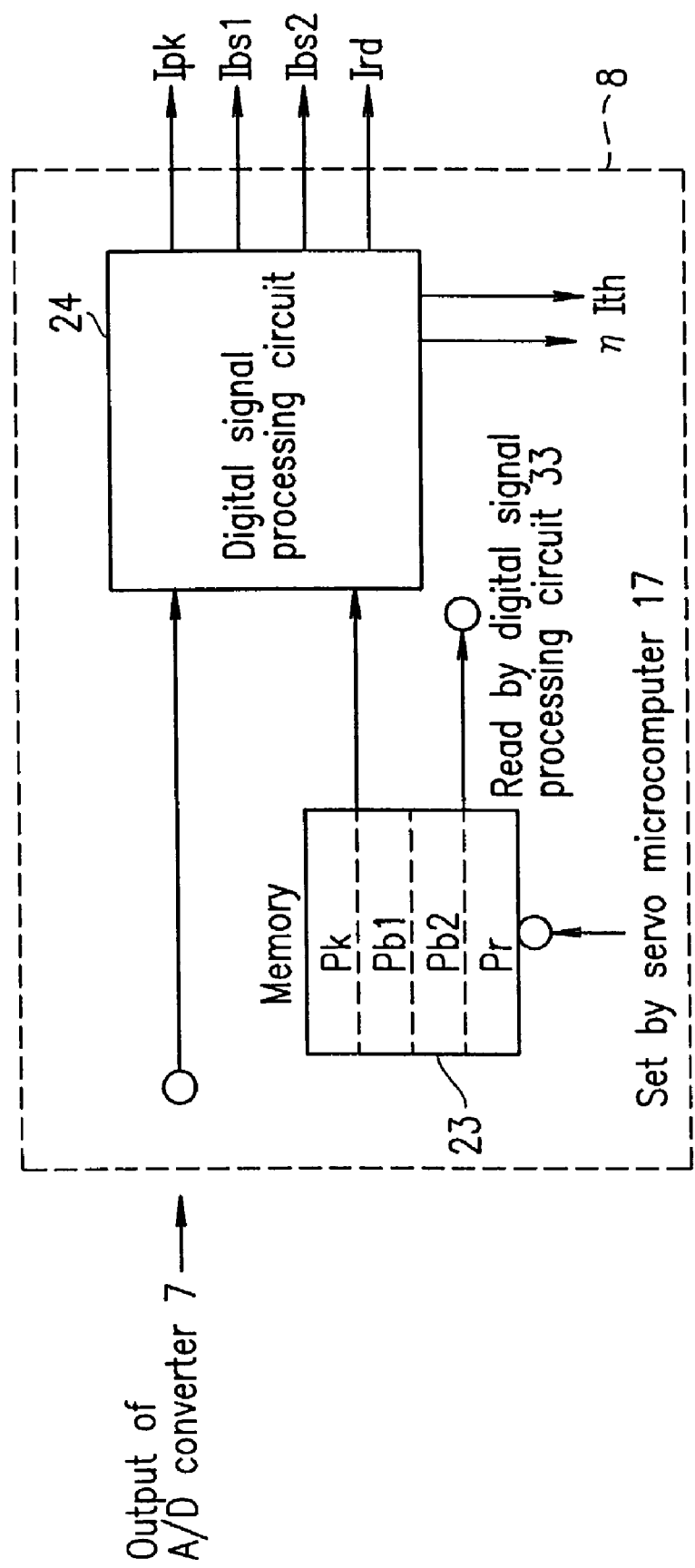
FIG. 4 illustrates a structure of an emitted light control section of the optical disc apparatus of FIG. 2.

Next, the structure and operation of the emitted light control section 8 are described with reference to FIG. 4. The emitted light control section 8 includes a memory 23 and a digital signal processing circuit 24. The memory 23 stores the three laser powers for performing correct recording, Pk, Pb1, and Pb2, and an appropriate reproduction power Pr. The values of these powers can be set by the servo microcomputer 17. The values stored in the memory 23 can be read by the digital signal processing circuit 24. The values stored in the memory 23 can also be read by a digital signal processing circuit 33 of the reflected light control section 12, which will be described later with reference to FIG. 5. The characteristics of the laser 3 are varied according to a change in the environmental temperature or the like. Since the threshold current (Ith) and quantum efficiency ($\eta$) are accordingly varied, the power of the output optical beam deviates from the values of Pk, Pb1, Pb2, and Pr set in the memory 23 with respect to the input driving current.

The digital signal processing circuit 24 calculates the threshold current Ith and quantum efficiency $\eta$ from an output of the A/D converter 7 when the level of the write gate signal input from the gate generator 15 is at the H level, and output the calculated values to the reflected light control section 12. Moreover, the digital signal processing circuit 24 calculates the values of Ipk, Ibs1, and Ibs2 such that the powers of the optical beam are equal to the value of Pk, Pb1, and Pb2 which are set in the memory 23, and output the calculated values to the switch 9. When the level of the write gate signal is at the L level, the digital signal processing circuit 24 calculates the value of current Ird from the output of the A/D converter 7 such that the power of the optical beam is equal to the value of Pr set in the memory 23, and outputs the calculated value to the switch 9. In the following descriptions, a loss of power which may be caused when the optical beam is transmitted through an objective lens or the like incorporated in the pickup 2 (not shown in FIG. 2) is included in the quantum efficiency $\eta$.

Figure 5:
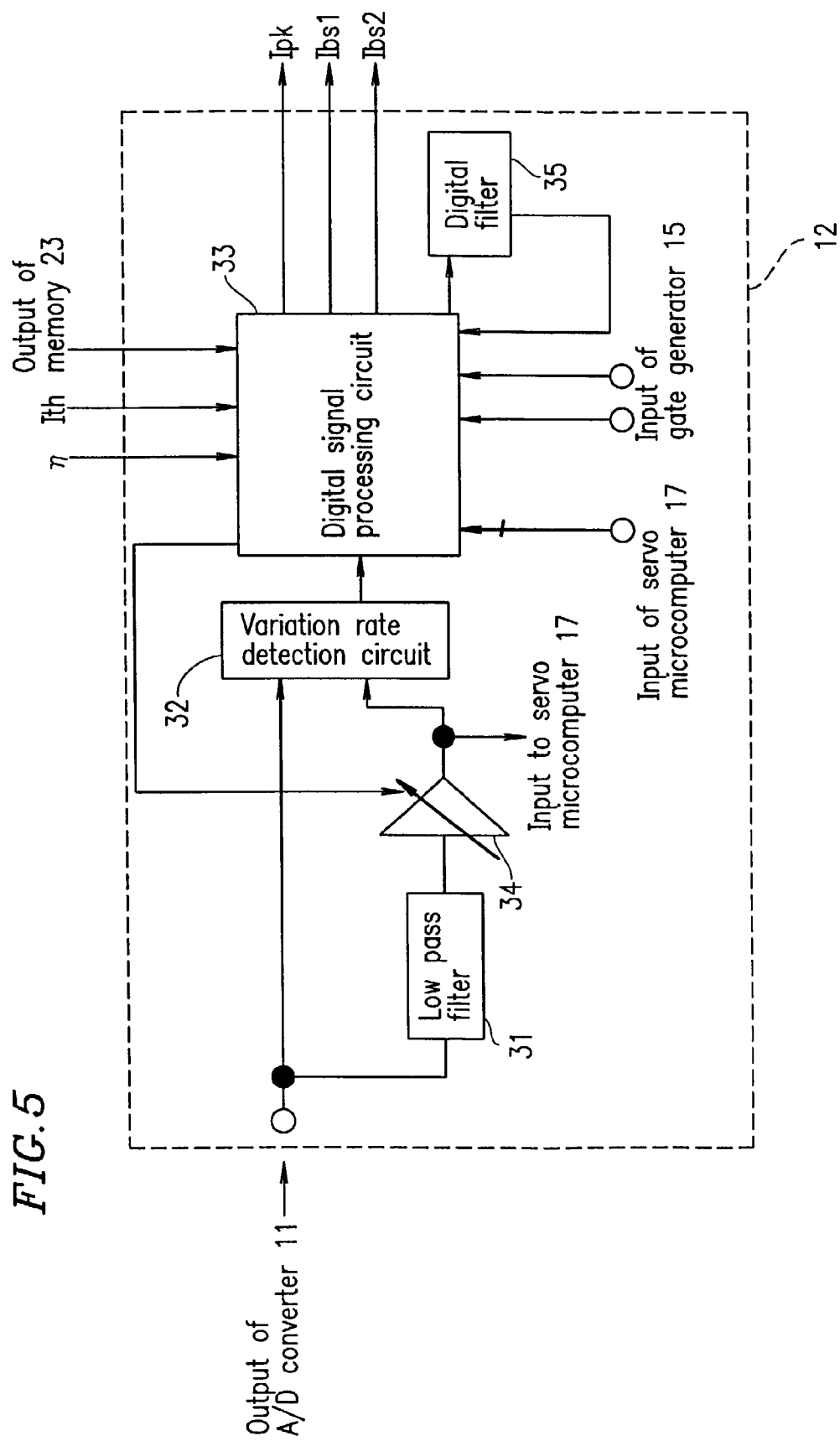
FIG. 5 illustrates a structure of a reflected light control section of the optical disc apparatus of FIG. 2.

Next, the structure and operation of the reflected light control section 12 are described with reference to FIG. 5. The reflected light control section 12 includes a low pass filter 31, a variation rate detection circuit 32, a digital signal processing circuit 33, an amplifier 34, and a digital filter 35. The low pass filter 31 receives an output of the A/D converter 11, and an output of the low pass filter 31 is input to the amplifier 34 having a variable amplification factor. The amplifier 34 is structured such that the amplification factor thereof is set by the digital signal processing circuit 33. The amplifier 34 amplifies the input signal at the set amplification factor and outputs the amplified signal to the servo microcomputer 17 and the variation rate detection circuit 32. The variation rate detection circuit 32 receives the output of the A/D converter 11 and the output of the amplifier 34, and uses the output of the amplifier 34 as a reference so as to obtain a value by dividing the output of the A/D converter 11 by the output of the amplifier 34. The obtained value is output to the digital signal processing circuit 33. The digital signal processing circuit 33 calculates Ipk, Ibs1, and Ibs2 according to the output of the variation rate detection circuit 32 when the level of the write gate signal and the data gate signal input from the gate generator 15 are at the H level, and outputs the calculated values to the switch 9. Herein, Ipk, Ibs1, and Ibs2 are calculated by using the values of η and Ith which are input from the emitted light control section 8 and the values of Pk, Pb1, and Pb2 which are set in the memory 23. Further, the digital signal processing circuit 33 receives from the servo microcomputer 17 information for changing the amplification factor of the amplifier 34 and changes the amplification factor of the amplifier 34 based on the information. Furthermore, the digital signal processing circuit 33 outputs a portion of the result calculated inside thereof to the digital filter 35 having characteristic of a low pass filter. The digital filter 35 delays the received value by a time corresponding to a delay characteristic of the low pass filter, and outputs the delayed value back to the digital signal processing circuit 33.

Figure 6:
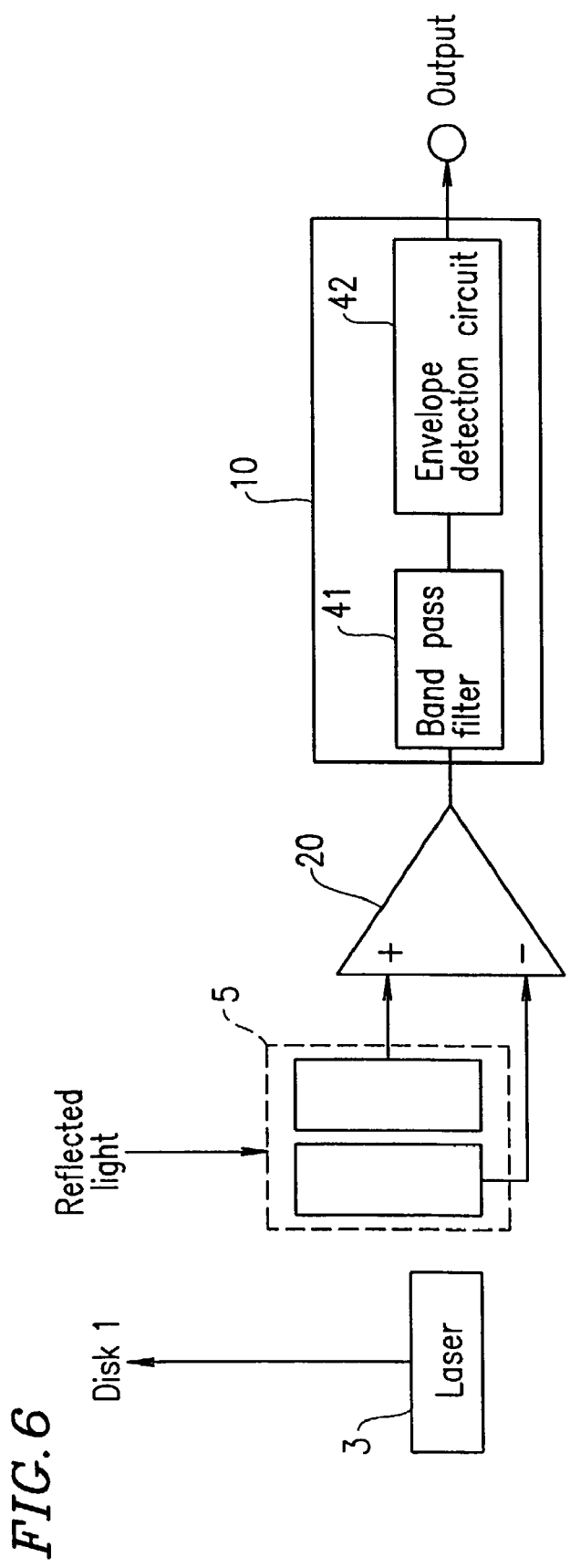
FIG. 6 illustrates a structure of a wobble amplitude detection section of the optical disc apparatus of FIG. 2.

Next, the structure of the wobble amplitude detector 10 is described with reference to FIG. 6. FIG. 6 shows the structure of the wobble amplitude detector 10 of FIG. 2. The power of the optical beam output from the laser 3 and reflected by the optical disc 1 is received by the photodetector 5 having a two-division structure and converted to an electric signal, which is then output to the differential amplifier 20. The differential amplifier 20 outputs a difference of the two input signals to the wobble amplitude detector circuit 10. A band pass filter 41 shown in FIG. 6 extracts a specific frequency component from the signal input from the differential amplifier 20 and outputs the extracted component. An output of the band pass filter 41 is input to an envelope detection circuit 42, and an envelope of the input signal is extracted and output.

Herein, the output of the differential amplifier 20 is a tracking error signal which is used when performing tracking control which is commonly conducted in an optical disc apparatus. An optical disc such as a DVD-RAM or the like is formed so as to have a track wobbling at a constant frequency in the radius direction. Thus, the output of the differential amplifier 20 includes a variation which is caused by a wobbling of the track. The band pass filter 41 extracts only a frequency component which is caused due to the wobbling of the track from the output of the differential amplifier 20 (157 kHz for a DVD-RAM optical disc having a capacity of 2.6 Gbytes on one surface). A signal output from the envelope detection circuit 42 has a same amplitude as that of the output of the band pass filter 41. That is, the amplitude of the signal output from the envelope detection circuit 42 is the same as that of the extracted wobbling component. In the description below, the output of the envelope detection circuit 42 is referred to as a wobble amplitude.

When a defect, e.g., dirt, such as dust, a fingerprint, etc., is present on the optical disc 1, the optical beam is partially absorbed or scattered by the defect before reaching the information recording surface of the optical disc 1. The scattered portion of the optical beam returns to the photodetector 5 having a two-division structure, and is subjected to difference-processing to be removed in the differential amplifier 20. Thus, only an unscattered portion of the optical beam is reflected by the optical disc 1 and input to the photodetector 5. An output of the photodetector 5 which has detected the optical beam left unscattered is decreased in comparison to that before the defect is attached. As the output of the photodetector 5 is decreased, the output of the differential amplifier 20 is decreased. As a result, the output of the wobble amplitude detector circuit 10 is decreased. That is, the level of the wobble amplitude signal is decreased during when the optical beam is passing over the defect. According to such a variation, the digital signal processing circuit 33 calculates Ipk, Ibs1, and Ibs2 such that the power reaching the information recording surface becomes an optimum power for forming a recording mark on the medium, and outputs the calculated Ipk, Ibs1, and Ibs2 to the switch 9.

Figure 7:
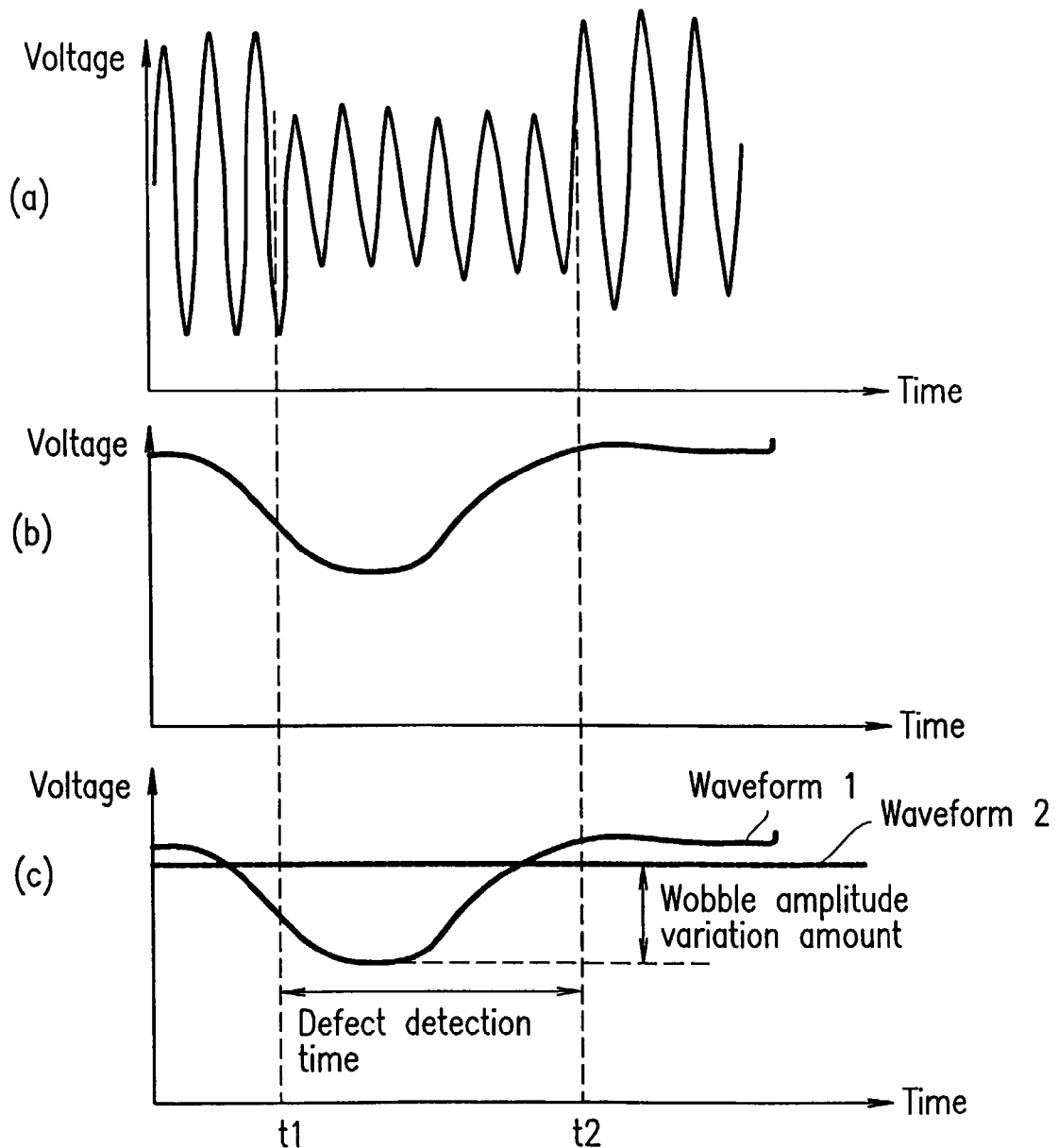
FIG. 7 illustrates an operation of a variation detection circuit in the reflected light control section of FIG. 5.

FIG. 7 shows an operation of detecting a variation of the wobble amplitude by the variation rate detection circuit 32. FIG. 7(a) shows a signal having a frequency of 157 kHz which is extracted by the band pass filter 41 in a graph where the horizontal axis denotes the time and the vertical axis denotes the voltage. FIG. 7(b) shows the waveform of the wobble amplitude output from the envelope detection circuit 42 when a signal having the waveform shown in FIG. 7(a) is input. Between time t1 and time t2, the wobble amplitude is decreased when the optical beam passes over the defect. On the other hand, the width of a track and the edge angle of a groove which forms the track vary when the optical disc 1 is produced. The wobble amplitude which is generated from a wobbling component of the track formed on the optical disc 1 varies according to the variations in the track width and the edge angle of the groove. The variation in the wobble amplitude is a factor which is independent of the variation in the wobble amplitude which is caused when obtaining an appropriate power for forming a recording mark on the optical disc 1.

Hereinafter, among the above variations, a variation which is caused when the optical beam is scanning a track is referred to as a circumferential variation, and a variation detected when the optical beam is moving in the radius direction of the optical disc 1 is referred to as a radius variation. The circumferential variation is caused at a frequency such that the original value of the wobble amplitude is recovered after a single turn of the optical disc 1. That is, the circumferential variation is caused at the rotation frequency of the optical disc 1. A reference value used for detecting a variation in the wobble amplitude should follow a variation in this frequency but should not follow the variation frequency resulting from a defect or the like. Thus, an output of the low pass filter 31 which passes through a band corresponding to the rotation frequency of the optical disc 1 is used as the reference value for detecting a variation in the wobble amplitude. In the case where the output of the low pass filter 31 is used as the reference value, the reference value follows an in-plane variation of the wobble amplitude, but does not follow a variation resulting from a defect or the like. Thus, only the variation in the wobble signal which results from a defect or the like can be detected. When the optical disc 1 is a DVD-RAM optical disc having a capacity of 2.6 Gbytes on one surface, the rotation frequency of the optical disc 1 is about 15 Hz to 38 Hz, and the variation frequency for the wobble amplitude which results from a defect is several hundreds of hertz to several tens of kilohertz. Thus, a filter having a cutoff frequency of about 50 Hz to 100 Hz is used as the low pass filter 31.

In a rewritable optical disc such as a DVD-RAM optical disc, during recording of information, a recording operation is sometimes performed together with a seeking operation of moving the position of the optical beam from a track in which recording is currently performed to another track. When recording of information is performed immediately after the seeking operation, a difference is caused between the wobble amplitude immediately before the seeking operation and the wobble amplitude immediately after the seeking operation due to the radius variation in the wobble amplitude. This difference appears as a power difference detected by the photodetector 5. However, this difference is varied at a frequency much higher than the band of the low pass filter 31 and accordingly is not distinguished from the variation caused in the wobble amplitude due to a defect. Thus, there is left a possibility that an error occurs in the power which is control by the reflected light control section 12. In order to prevent this problem, the digital signal processing circuit 33 operates so as to change the amplification factor of the amplifier 34 based on the information input from the servo microcomputer 17 immediately before and immediately after the seeking operation, such that the output of the amplifier 34 is maintained to be constant.

Since the wobble amplitude varies according to the power irradiated on the optical disc 1, if a frequency at which the power of the output optical beam is varied is beyond the band of the low pass filter 31 after the operations of the emitted light control section 8 and the reflected light control section 12, it is necessary to correct the amplification factor of the amplifier 34 before and after the power is varied, such that the output of the amplifier 34 is maintained to be constant.

When the value set in the memory 23 of the emitted light control section 8 is varied, the above correction is performed by changing the amplification factor of the amplifier 34 based on a proportion obtained by changing the set value by the servo microcomputer 17. A variation component in the wobble amplitude which is caused by a factor independent of a variation in the optimum power for forming a recording mark can be absorbed by operating the low pass filter 31 and the amplifier 34 in a combined manner. Thus, only a variation in the wobble amplitude which is caused due to a defect can be detected by the variation rate detection circuit 32.

An operation of detecting the variations in the wobble amplitude shown in FIG. 7 by using the variation rate detection circuit 32 is described in detail. In FIG. 7(c), waveform 1 represents an output of the A/D converter 11 when a signal having a waveform shown in FIG. 7(b) is input, and waveform 2 represents an output of the amplifier 34 when a signal having waveform 1 is input. The variation rate detection circuit 32 uses the output of the amplifier 34 (represented by waveform 2) as a reference to detect a variation in waveform 1 as a variation in the wobble amplitude which is caused due to a defect.

Hereinafter, a supplemental description is provided with exemplary values. First, an output of the wobble amplitude detector circuit 10 is varied according to the power of an optical beam output from the laser 3. That is, an output of the wobble amplitude detector circuit 10 is varied because the power of the optical beam is different between a recording operation and a reproduction operation of the apparatus. In the reproduction operation, the power Pr=1 mW is output. In the recording operation, a generally averaged power obtained by switching the powers, Pk=11 mW, Pb1=5.5 mW, and Pb2=1.5 mW, is output. For the purpose of simplifying the explanation, the generally averaged power is assumed to be about 10 mW, and in this case, the output for the recording operation is ten times greater than that for the reproduction operation.

Assume that the level of a signal output from the wobble amplitude detector circuit 10 during a recording operation when a defect is not present on the optical disc 1 is about 1V. Further assume that the output of the wobble amplitude detector circuit 10 exhibits 800 mV due to a circumferential variation in the wobble amplitude. In this case, a value output from the A/D converter 11 is 800 mV. Thus, a value input to the low pass filter 31 is 800 mV. Since the circumferential variation is smaller than the cutoff frequency of the low pass filter 31, the output of the low pass filter 31 is 800 mV. If the amplification factor of the amplifier 34 is 1, an output of the variation rate detection circuit 32 is 800/800=1, i.e., a variation is not detected.

Alternatively, assume a case where the output of the wobble amplitude detector circuit 10 results in 560 mV by passage of the optical beam over a region in which a defect is present. Since the low pass filter 31 cannot follow this variation, the low pass filter 31 outputs a value of 800 mV. Thus, the output of the variation rate detection circuit 32 results in 560/800=0.7. As a result, a decrease in the wobble amplitude by 30% due to a defect can be detected. In a later section, the amplification factor of the amplifier 34 will be described with specific values.

Next, an operation of the gate generator 15 is described with reference to FIG. 8. Similar to FIG. 1(a), FIG. 8(a) schematically shows a transition of an optical beam along a track which is achieved by means of rotation of the optical disc 1. The track 10 is uniformly divided by units of a sector (12). The sector 12 has an address region (header region) at the head thereof where an address for identifying the sector 12 is recorded. A region which is present immediately after the header region and in which no data to be reproduced exists or no data is recorded is referred to as a gap region. The gap region is followed by a data region for recording data.

Figure 8:
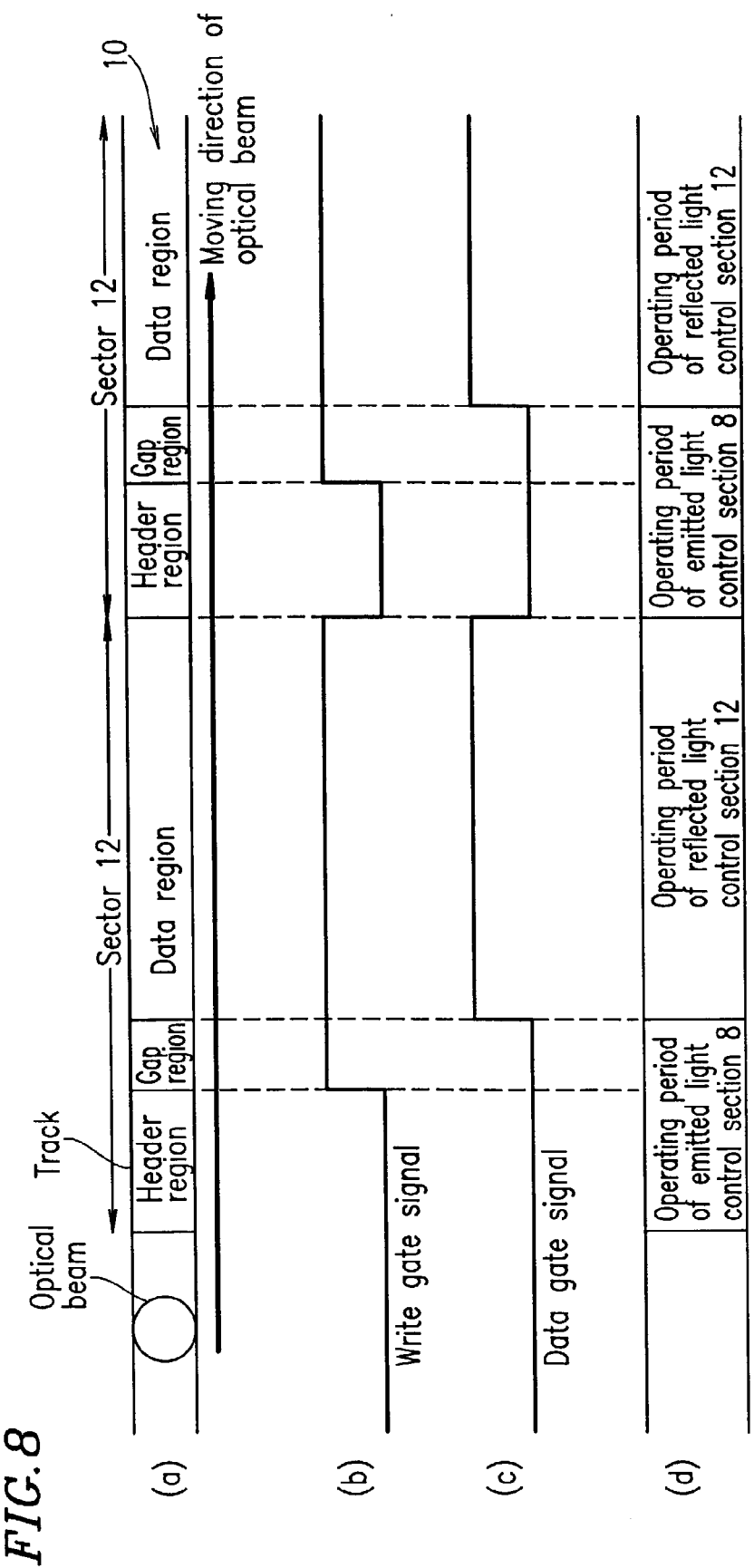
FIG. 8 illustrates an operation of a switch of the optical disc apparatus of FIG. 2.

FIG. 8(b) shows a timing chart for a write gate signal which is output when an optical beam is within the regions shown in FIG. 8(a). FIG. 8(c) shows a timing chart for a data gate signal which is output when the optical beam is with in the regions shown in FIG. 8(a). In FIG. 8, vertically-running broken lines indicate a temporal synchronization relationship between a position of the optical beam over the regions shown in FIG. 8(a), and the timing chart, for the write gate signal in FIG. 8(b) and the timing chart for the data gate signal in FIG. 8(c).

The gate generator 15 identifies, by an address input from the signal processing section 22, a sector over which the optical beam is currently passing as a sector in which information is to be recorded, and outputs a write gate signal which rises to the H level at the start of the gap region. The write gate signal is maintained to be at the H level until the optical beam reaches the start of a header region in a next sector, and falls to the L level again in the header region. The gate generator 15 outputs a data gate signal which is at the H level when the optical beam is passing over the data region and is otherwise at the L level regardless of whether information is to be recorded in a current sector. FIG. 8(d) will be described later.

Next, an operation of the AND circuit 16 is described. The AND circuit 16 receives a write gate signal and a data gate signal output from the gate generator 15 and a forced outage signal output from the servo microcomputer 17. The forced outage signal is at the L level when an operation of the optical disc apparatus 200 having the components shown in FIG. 2 is begun and when the optical beam goes off the track (off-track) that is currently scanned, and is otherwise at the H level. An operation which uses the forced outage signal output from the servo microcomputer 17 is described later. At the beginning of the operation of the apparatus and at the time of off-track, the output of the servo microcomputer 17 is at an L level. Thus, a L level signal is output from the AND circuit 16 regardless of the level of the other input signals. On the other hand, the output of the servo microcomputer 17 is at a H level except at the beginning of the operation of the apparatus and at the time of off-track, and the output of the AND circuit 16 is determined based on the polarity of any other input signal. As described above, the write gate signal is at the H level for the gap region and the data region in a sector in which information is recorded, and is otherwise at the L level. The data gate signal is always at the H level in the data region and is otherwise at the L level. Thus, when the forced outage signal output from the servo microcomputer 17 is at the H level, the output of the AND circuit 16 is at the H level in the data region in a sector in which information is recorded and is otherwise at the L level.

Next, an operation of the switch 9 which operates according to an input from the AND circuit 16 is described with reference to FIG. 9. First, the switch 9 is switched to an output side 9b of the reflected light control section 12 when an input signal at a control terminal is at the H level, and is switched to an output side 9a of the emitted light control section 8 when the input signal at the control terminal is at the L level. Thus, only when an off-track does not occur and when the optical beam is within the data region during a data recording operation does the input of the switch 9 switch to the output side 9b of the reflected light control section 12. Otherwise, the input of the switch 9 is switched to the output side 9a of the emitted light control section 8. FIG. 8(d) shows the selection of the outputs of the emitted light control section 8 and the reflected light control section 12 by the switch 9 when the optical beam is passing over the sector shown in FIG. 8(a).

The write gate signal is input in the recording waveform generation section 13. When the write gate signal is at the L level, the value of Ird is selected in the recording waveform generation section 13, and the selected value of Ird is output to the driving section 14. The power of the optical beam output from the laser 3 is controlled so as to be the value of Pr, which is used for reproducing data in the optical disc 1.

Hereinafter, an operation and function of each of the components shown in FIG. 2 are described in more detail.

First, an operation performed when an optical beam is present within a sector in which information is to be recorded, and the optical beam is passing over a region having no defect within a data region, and an operation performed when the optical beam is passing over a defect present in the data region will be described. Then, an operation performed when the defect extends to the head of a data region in a next sector will be described. Thereafter, a function of each component of the optical disc apparatus shown in FIG. 2 which is achieved when the optical disc apparatus starts to operate, an operation performed when an appropriate power for forming a recording mark is varied in a band lower than that of the low pass filter 31, an operation performed when recording of information is performed together with a seeking operation, and an operation performed when an off-track occurs during the recording of information will be described in this order.

Figure 10:
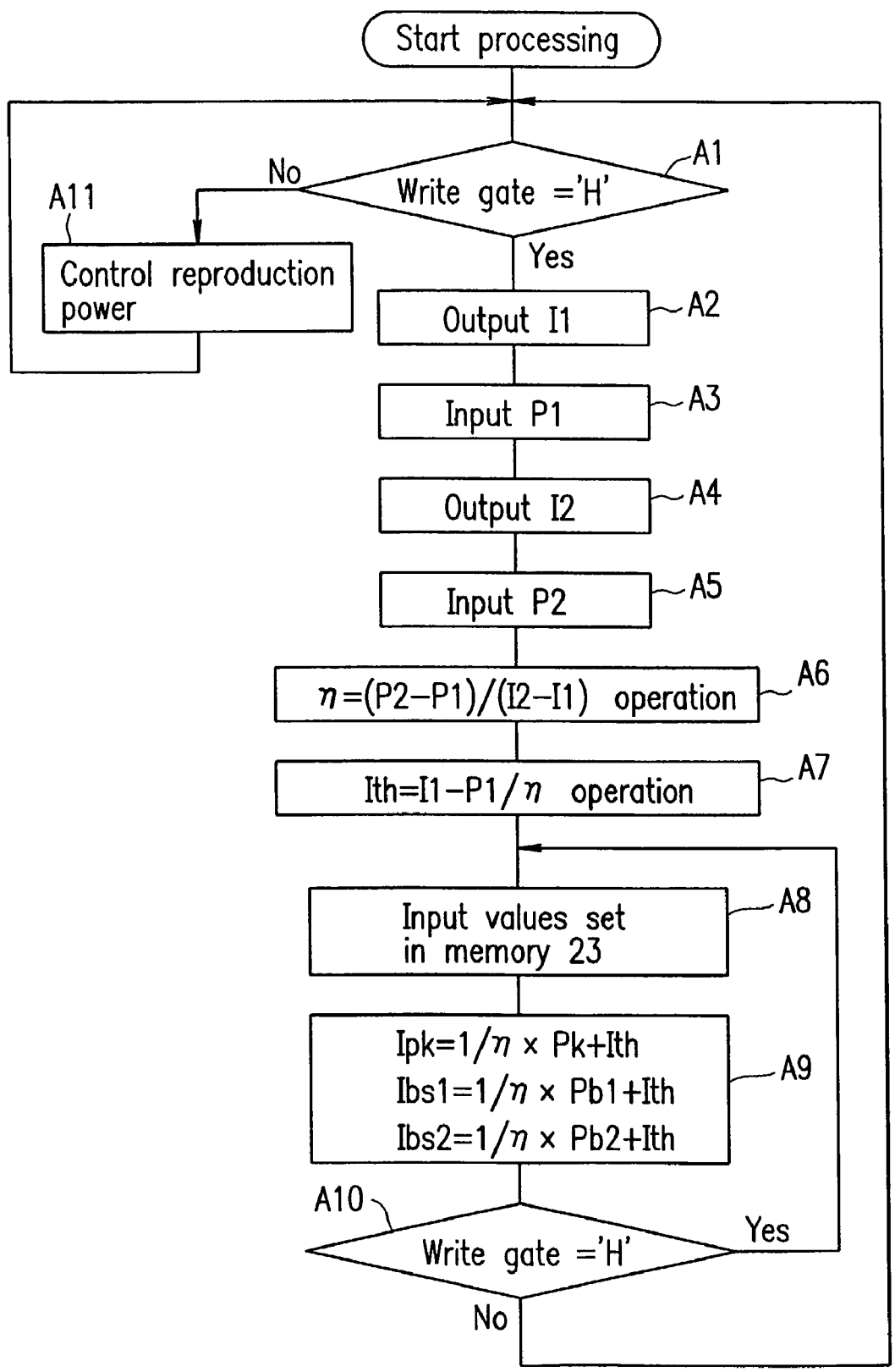
FIG. 10 is a flowchart for illustrating an operation of the emitted light control section of the optical disc apparatus of FIG. 2.
Figure 11:
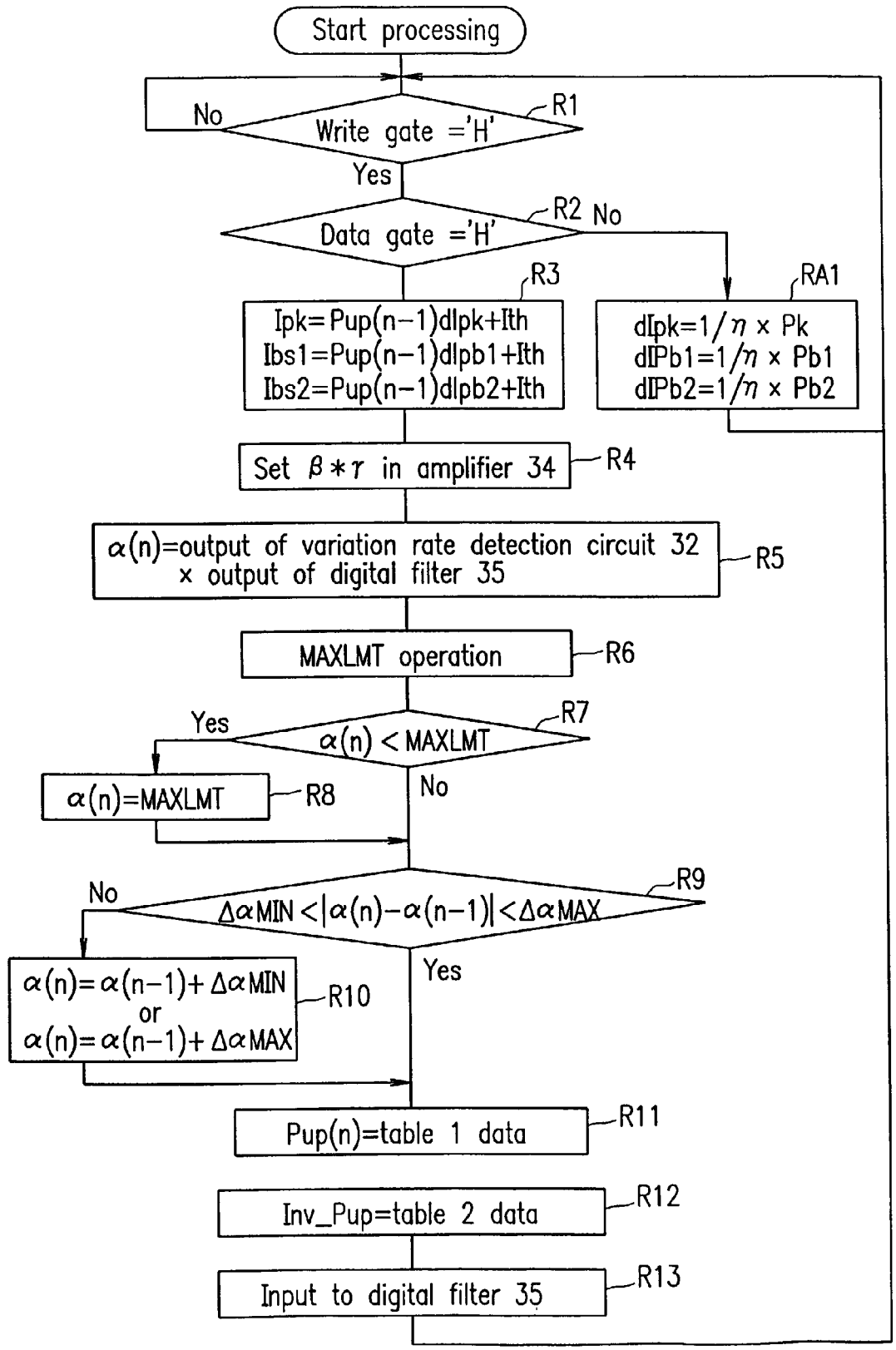
FIG. 11 is a flowchart for illustrating an operation of the reflected light control section of the optical disc apparatus of FIG. 2.

An operation performed when an optical beam is present within a sector in which information is to be recorded, and the optical beam is passing over a region having no defect within a data region, and an operation performed when the optical beam is passing over a defect present in the data region are described with reference to FIGS. 10 and 11. FIG. 10 is a flowchart illustrating an operation of the digital signal processing circuit 24 in the emitted light control section 8. FIG. 11 is a flowchart illustrating an operation of the digital signal processing circuit 33 in the reflected light control section 12.

Prior to the processing of FIGS. 10 and 11, the motor 6 rotates the optical disc 1 at a predetermined rotation speed. The servo microcomputer 17 performs focusing control such that the optical beam is focused on the information recording surface of the optical disc 1, and performs tracking control such that the optical beam follows a track of the optical disc 1.

First, the optical beam is placed before the header region in a target sector in which data is recorded. Then, when the optical beam reaches the head of the header region, both the write gate signal and the data gate signal which are output from the gate generator 15 are at the L level, and the forced outage signal output from the servo microcomputer 17 is at the H level. The AND circuit 16 outputs a low (L) signal to the switch 9, and the switch 9 switches its input to the output side 9a of the emitted light control section 8.

The recording waveform generation section 13 receives the write gate signal at the L level, and accordingly, selects the value of Ird, among the four driving current values Ipk, Ibs1, Ibs2, and Ird, which are input through the switch 9, and outputs the selected value to the driving section 14. The power of the optical beam output from the laser 3 is the reproduction power represented by the value of Pr.

Step A1 in FIG. 10 is a processing step for detecting the polarity of the write gate signal. The process proceeds to step A11 because the write gate signal is at the L level. Step A11 is a processing step for calculating the value of Ird. An operation for the processing is commonly employed in an optical disc apparatus, and therefore, detailed descriptions thereof are omitted. The value of Ird is obtained according to a difference between the output of the A/D converter 7 and the value of Pr which is set in the memory 23 such that the value of Pr is generally constant, and the obtained value of Ird is output to the switch 9. The process then returns to step A1 again.

Step R1 in FIG. 11 is a processing step for detecting the polarity of the write gate signal. The reflected light control section 12 detects that the write gate signal is at the L level, and performs the processing at step R1 again and is on standby until the write gate signal rises to the H level. During reproduction of information in the header region, the signal processing section 22 outputs to the gate generator 15 an address for identifying a sector in which the optical beam is present. The gate generator 15 identifies a sector currently scanned by the optical beam as a sector in which information is to be recorded, and pulls the write gate signal to the H level when the optical beam reaches the head of the gap region.

At step A1, it is detected that the write gate signal is at the H level, and the process proceeds to step A2. In this example, electric currents having specific values, I2 for Ipk and I1 for Ibs1, are output. After detecting that the write gate signal rises to the H level, the recording waveform generation section 13 selects and outputs Ibs1 and Ipk to the driving section 14 every 500 ns which is the time the front photodetector 4 requires to convert the power of the optical beam into an electric signal. Thereafter, the three currents Ipk, Ibs1, and Ibs2 are switchingly output for forming a recording mark as described above with reference to FIG. 3.

Assume that the laser 3 output power P1 when an electric current corresponding to value I1 of Ibs1 is output to the driving section 14, and the laser 3 output power P2 when an electric current corresponding to value I2 of Ipk is output to the driving section 14. First, at step A2, specific current value I1, which results in Ibs1=I1, is output. At step A3, after 500 ns, which is the time required for stabilizing the output in the front photodetector 4, has passed; power P1 of the received optical beam is input through the A/D converter 7. At the subsequent step, step A4, specific current value I2, which results in Ipk=I2, is output. At step A5, similarly to step A3, power P2 of the optical beam received after 500 ns is input through the A/D converter 7. Hereinafter, an example is described with a specific values, where P1 is 5 mW when I1 is 38 mA, and P2 is 10 mW when I2 is 47 mA. At the subsequent step, step A6, quantum efficiency η of the laser 3 is obtained by the following expression, and the obtained quantum efficiency η is output to the reflected light control section 12:

$$\eta=(P2-P1)/(I2-I1)=(10-5)/(47-38)=0.55 (mW/mA).$$

Next, at step A7, threshold current Ith of the laser 3 is obtained by the following expression, and the obtained current Ith is output to the reflected light control section 12:

$$Ith=I1-P1/\eta=38-5/0.55=28.9 \text{ (mA)}.$$

Subsequently, at step A8, the values Pk, Pb1, and Pb2 which are set in the memory 23 are read out. In this example, Pk=11 mW, Pb1=5.5 mW, Pb2=1.5 mW.

At step A9, Ipk, Ibs1, and Ibs2 are obtained by the following expressions, and the obtained values are output to the switch 9:

$$Ipk=1/\eta \times Pk+Ith= 1/0.55 \times 11+28.9= 48.9 \text{ (mA)}$$

$$Ibs1=1/\eta \times Pb1+Ith=38.9 \text{ mA}$$

$$Ibs2=1/\eta \times Pb2+Ith=31.6 \text{ mA}$$

Ith and η can be determined by the above expressions even when a change in the environmental temperature causes a variation in the I-L characteristic of the laser 3. Thus, the driving currents, Ipk, Ibs1, and Ibs2, which are required for outputting Pk, Pb1, and Pb2, can be corrected.

Herein, the gap region is a region where no data to be reproduced exists, and no data is to be recorded as described above. Thus, data to be recorded in the optical disc 1 and data recorded in the optical disc 1 cannot be damaged even when power P1 and power P2, which are different from the power used for forming a recording mark as described above, are output for 500 ns. Thus, a photodetector with a lower band can be used as the front photodetector 4. After the period of 1 µs in total, where above powers P1 and P2 are output when the optical beam is passing over the gap region, has elapsed, the recording waveform generation section 13 switches newly-updated values Ipk, Ibs1, and Ibs2 at a high speed according to the control signal from the recording information generation section 19, and the selected value is output to the driving section 14, in order to form a recording mark as described above. Next, an operation of the reflected light control section 12 which is performed when the optical beam is present within the gap region is described.

At step R1, it is detected that the write gate signal is at the H level, and the process proceeds to step R2. Step R2 is processing for detecting the polarity of the data gate signal. The process proceeds to step RA1 because the data gate signal is at the L level when the optical beam is passing over the gap region. Herein, as described above, the frequency of a variation in the wobble amplitude which is caused when the optical beam passes over a defect is several hundreds of hertz to several tens of kilohertz. When control is performed so as to correct a variation of several tens of kilohertz, the digital signal processing circuit 33 is preferably structured so as to operate at a sampling frequency of several hundreds of kilohertz. On the other hand, typically, the emitted light control section 8 is only required to operate so as to follow the frequency at which the I-L characteristic varies due to a change in the environmental temperature. Since a gain crossover is about 1 to 10 kHz at most, an operation of the digital signal processing circuit 24 at the sampling frequency of about 100 kHz is sufficient. In order to suppress an increase in cost in the case of incorporating a function of the present invention into an optical disc apparatus, it is desirable that the digital signal processing circuit 33 is structured such that a processor which operates at a low speed and which forms the digital signal processing circuit 24 used in an existing apparatus is operated in a time-divisional manner. Thus, for a purpose of employing a processor which operates at a low speed, among the operations performed by the digital signal processing circuit 33, the number of arithmetic operations for obtaining a driving current used when the optical beam is passing over a defect is reduced to be as small as possible, thereby reducing the processing time.

At step RA1, in order to shorten the processing time for the operations performed when the optical beam is passing over the defect, some of the operations, which are performed based on a value of the quantum efficiency η obtained with the above-described operations and output by the digital signal processing circuit 24 when the optical beam is within the gap region, are performed in advance. These operations are specifically described. Assume that a variation value of the power, Pup(n), is obtained using an output of the variation rate detection circuit 32 by a method described below. Operations which are necessary for obtaining Ipk, Ibs1, and Ibs2 are:

$$Ipk=Pup(n) \times 1/\eta \times Pk+Ith$$

$$Ibs1=Pup(n) \times 1/\eta \times Pb1+Ith$$

$$Ibs2=Pup(n) \times 1/\eta \times Pb2+Ith$$

When η=0.55 mW/mA and Pk=10 W, 1/η=1.8181, and an operation result of 1/η×Pk is 18.181. Thus, the accuracy of the value of a fractional part of 1/η=1.8181 determines the accuracy of the operation result. In order to increase the accuracy of the operation result, it is necessary to increase the accuracy of a result for division processing of 1/η. However, a high-performance processor which has a long output word length for the division processing and which achieves a short operation time is generally expensive, and therefore, the cost of an apparatus increases when using such a processor. When a processor which has a short output word length and which consumes a long operation time is employed, operations which are not associated with Pup(n) are performed in advance at step RA1 in order to shorten the processing time for the subsequent processing. For example, as for Pk, an operation of 1/η×Pk is performed in advance so as to obtain a constant dIpk.

In the description below, it is assumed that, in the processing performed when the optical beam passes over a defect, an intended driving current value Ipk can be obtained only by multiplying dIpk by Pup(n) and adding Ith thereto. Similarly, dIpb1 and dIpb2 are obtained for Pb1 and Pb2. The values of Pk, Pb1, and Pb2 used herein are values set in the memory 23 which are read by the digital signal processing circuit 33 provided inside the emitted light control section 8. With specific values, Pk=11 mW, Pb1=5.5 mW, Pb2=1.5 mW, and η=0.55 mW/mA, dIpk, dIpb1 and dIpb2 are calculated as follows:

$$dIpk=1.8181 \times 11=19.9991 \text{ (MA)}$$

$$dIpb1=1.8181 \times 5.5=9.9995 \text{ (mA)}$$

$$dIpb2=1.8181 \times 1.5=2.7278 \text{ (mA)}$$

The above operations are performed at step RA1 to calculate dIpk, dIpb1 and dIpb2. Then, the process returns to step R1.

Next, an operation performed when the optical beam is located at the head of the data region and then moves within the data region where no defect is present will be first described, and then, an operation performed when the optical beam is passing over a defect will be described. In these operations, the gate generator 15 outputs the write gate signal and data gate signal, both of which are at the H level. The forced outage signal output from the servo microcomputer 17 is at the H level. Thus, the AND circuit 16 outputs the H signal to the switch 9, and the input of the switch 9 is switched to the output side 9b of the reflected light control section 12. First, an operation of the emitted light control section 8 is described. Since the write gate signal is maintained at the H level, the process is branched from step $A_{10}$ to step $A_8$, and then, the above-described processing is repeated, whereby the above values, Ipk=48.9 mA, Ibs=38.9 mA, and Ibs2=31.6 mA, are output as they are.

Next, an operation of the reflected light control section 12 is described. At step R2, it is detected that the data gate signal is at the H level, and the process then proceeds to step R3. In the description below, an operation for each step in FIG. 11 will be described with abbreviations, and then, an operation performed when the optical beam is present within the data region will be described with specific values.

At step R3, the value which represents a variation in the power of the optical beam which is caused in the operation of the reflected light control section 12 at a preceding step, Pup(n−1), is multiplied by each of dIpk, dIpb1, and dIpb2 which are obtained at step RA1, and Ith which is input from the emitted light control section 8 to the digital signal processing circuit 33 is added to each of the results of the multiplication, thereby obtaining Ipk, Ipb1, and Ipb2. The obtained Ipk, Ipb1, and Ipb2 are output to the switch 9. Herein, the mark "Pup(n−1)" is used for the purpose of distinguishing, in the processing of FIG. 11, the variation value Pup(n) of the power obtained during the previous operation from a variation value obtained in subsequent processing. When the reflected light control section 12 has not been previously operated, Pup(n−1)=1 is employed as an initial value.

Next, at step R4, value γ, which represents a variation in the value set in the memory 23 of the emitted light control section 8, is multiplied by value β, which represents a variation in the output of the amplifier 34 which is caused during a seeking operation. The amplification factor set in the amplifier 34 is changed by a factor of the value obtained by the above multiplication. Value γ is obtained by internal processing of the servo microcomputer 17, which is described later with reference to FIG. 16, and output to the digital signal processing circuit 33. Value β is similarly obtained by internal processing of the servo microcomputer 17, which is described later with reference to FIG. 16, and output to the digital signal processing circuit 33.

As the subsequent step, step R5, a value input from the variation rate detection circuit 32 to the digital signal processing circuit 33 is multiplied by a value input from the digital filter 35 to the digital signal processing circuit 33, thereby obtaining value α(n). The output of the digital filter 35 changes according to value INV_Pup which is input at step R13 (described later). Since the wobble amplitude changes according to the power of the optical beam, it is necessary to correct the output of the variation rate detection circuit 32 according to the power of the optical beam output by means of the operation of the reflected light control section 12. This value is correction value INV_Pup.

The relationship between α(n) and INV_Pup is described in detail. It should be noted first that the output of the variation rate detection circuit 32 does not necessarily represent a variation of the optimum power for forming a recording mark. When there is no defect, the power of an optical beam received by the photodetector 5 with respect to the emitted power is determined according to the reflectance and transmittance which are determined based on the quality of a recording material and a protective film material which form the optical disc 1. When a defect exists, a portion of the power of the optical beam is absorbed or scattered by the defect and hence lost, and the remaining power of the optical beam reaches the information recording surface of the optical disc 1 and is reflected by this surface. Then, when the reflected optical beam again passes through the defect, a portion of the power of the reflected optical beam is lost by absorption and scatterring, and the partially-lost optical beam is received by the photodetector 5. Thus, the power detected by the photodetector 5 is different from the power that reached the information recording surface by the loss caused after the reflection at the information recording surface. That is, since the output of the variation rate detection circuit 32 represents the wobble amplitude which is detected after the optical beam has passed twice through the same defect, the amount of an increase in the power which is provided for obtaining the optimum power on the information recording surface is the square root of the output of the variation rate detection circuit 32. Thus, the relationship between value α(n), which is obtained after correcting the output of the variation rate detection circuit 32 with INV_Pup, and value Pup(n) obtained in this step, which represents a change in the power that is made in order to obtain the optimum power on the information recording surface, is $1/\alpha(n)=[Pup(n)]^2$, i.e., $1/\alpha(n)$ is equal to Pup(n) squared. This relationship is described using specific numbers.

First, assume that the wobble amplitude is reduced by 10% when the optical beam is passing over a defect, and for the simplicity of description, INV_Pup=1. In this case, the output of the reflectance detection circuit 32 is 0.9, and the output of the digital filter 35 is 1 because INV_Pup=1. As a result, α(n)=0.90. Thus, Pup(n)=1/√0.9= 1.05. That is, the current power is increased by a factor of 1.05 in order to obtain an optimum power for forming a recording mark.

Since the frequency at which the power of the reflected light is varied due to a defect is, as described above, several tens of kilohertz, the frequency at which the current power is varied by means of the operation of the reflected light control section 12 is also several tens of kilohertz. On the other hand, the band of the low pass filter 31 is 100 Hz. When the power is increased by a factor of 1.05, the wobble amplitude is also increased by a factor of 1.05. However, the output of the low pass filter 31 cannot follow such change. Thus, at the time when the digital signal processing circuit 33 begins the next operation, the output of the variation detection circuit 32 is equal to the decreased power (which is caused due to the defect) increased by a factor of 1.05. This influence can be removed by increasing the output of the variation detection circuit 32 by a factor of 1/1.05=0.95. This correction value, 0.95, is used as a value for INV_Pup in the next operation.

When a low-performance processor is employed, a long processing time is required for obtaining the operation result of $1/\sqrt{\alpha(n)}$, and it is difficult to obtain Pup(n) and INV_Pup with α(n) changing at several tens of kilohertz. Thus, values for Pup(n) and INV_Pup which correspond to a plurality of possible values for α(n) are previously obtained, and the obtained values are stored in a memory (not shown) provided inside the digital signal processing circuit 33 in the form of a table containing a plurality of data. The value of $\alpha(n)$ obtained at step R5 is used as an address of the table, whereby Pup(n) and INV_Pup can be readily obtained.

FIG. 12 shows an example of the table. For example, if the wobble amplitude is reduced by 30% when the optical beam is passing over a defect, $\alpha(n)=0.7$ when INV_Pup=1, similarly as described above. Thus, Pup(n)=1.19 and INV_Pup=0.84 are selected. At the subsequent step, step R6, a clip value for the value $\alpha(n)$ is obtained such that Pk multiplied by Pup(n) does not exceed an output limitation power, Pmax, which may result in breakage of the laser 3, and this clip value is stored in memory MAXLMT. The memory MAXLMT performs an operation of Pmax÷Pk, and a result of this operation, Pup(n), is used as an address for data in the above table, whereby Pup(n) and INV_Pup can be obtained by selecting a corresponding value for $\alpha(n)$ along an inverse route of that described above.

The operations are described with specific values. Consider a case where the value of Pk currently set in the memory 23 is 12 mW, and the rated Pmax of the laser 3 is 15 mW. In this case, Pmax/Pk=1.25, which is equal to a limitation of Pup(n). Thus, in the table data shown in FIG. 12, a value of $\alpha(n)$ corresponding to a value of Pup(n) which is equal to or smaller than 1.25 is selected for MAXLMT. According to the table shown in FIG. 12, a value of $\alpha(n)$ corresponding to a value of Pup(n) which is equal to or smaller than 1.25 is 0.64 for Pup(n)=1.25, which is selected for MAXLMT. At the subsequent step, step R7, the values of $\alpha(n)$ and MAXLMT are compared. If $\alpha(n)<$MAXLMT, the process proceeds to step R8.

At step R8, the value of $\alpha(n)$ is replaced with the value stored in MAXLMT, and then, the process proceeds to step R9. If $\alpha(n)>$MAXLMT at step R7, the process directly proceeds to step R9. When the optical beam is passing over the defect, the power 6f the optical beam which reaches the information recording surface is insufficient for correctly forming a recording mark as described above. In this case, no modulation occurs due to a recording mark, and accordingly, the amplitude of the RF signal is decreased. On the other hand, when the reflected light control section 12 operates, the output power is increased so that a recording mark is correctly formed. As a result, modulation occurs due to the correctly-formed recording mark, and the amplitude of the RF signal is increased. When a variation of the power which is output when the reflected light control section 12 operates is large, the amplitude of the RF signal sharply changes.

In general, an optical disc apparatus reproduces data recorded on the optical disc 1 based on a signal obtained by binarizing the RF signal in the signal processing section 22. In this case, an AGC (Auto Gain Control) operation is performed in order to make the amplitude of the RF signal constant. If the reflected light control section 12 operates and the amplitude of the RF signal is sharply increased when the amplitude of the RF signal, which is decreased when the optical beam is passing over the defect, is increased by the AGC operation, a variation in the amplitude of the RF signal inside the signal processing section 22 becomes large. As a result, correct binarization is not performed, and it sometimes becomes difficult to reproduce data recorded in the optical disc 1.

Thus, with respect to a variation in the wobble amplitude which is caused when the optical beam is passing over the defect, the amount of power which can be changed at one step should be limited. Herein, the mark, $\alpha(n-1)$, is used in order to distinguish from $\alpha(n)$ obtained at step R5 in the previous operation of the process illustrated in FIG. 11. At step R9, it is determined whether the difference between $\alpha(n-1)$, which has been output in the previous operation, and $\alpha(n)$, which is output in this operation, is within the range defined by fixed values, $\Delta\alpha$MAX and $\Delta\alpha$MIN, which limit the variation of $\alpha(n)$. If the difference is out of the range, the process proceeds to step R10. If the difference is within the range, the process proceeds to step R11. At step R10, $\alpha(n)$ is replaced with a limitation value, $\alpha(n-1)+\Delta\alpha$MIN or $\alpha(n-1)-\Delta\alpha$MAX, and the process proceeds to step R11. The power obtained through the above processing can be prevented from being largely changed from the previously-obtained power.

At step R11, the above-described table is used to select a value for Pup(n) by using the value of $\alpha(n)$ as an address for referring data in the table. At the subsequent step, step R12, a value for INV_Pup is selected by using the above table similarly as described above. Herein, the value for Pup(n) can be obtained only within the range limited by values which are determined by the word length of the processor, and is different from an actually-required variation value for the power of the optical beam. For example, when $\alpha(n)$ is 0.7, an ideal value for Pup(n) is Pup(n)=$1/\sqrt{0.7}=1.19522$ . . . . However, when a processor used has a word length which can express only two decimal places, Pup(n)=1.19. In this case, a power corresponding to a value removed by rounding from the ideal value for Pup(n) is a deficit power. In the meantime, the correction value INV_Pup is also corrected in view of the deficit, and a detection error for a variation value of the wobble amplitude, which is detected after the output of the variation detection circuit 32 has been corrected, is reduced by using the corrected correction value. Specifically, when $\alpha(n)=0.7$, an ideal value for INV_Pup is INV_Pup=$\sqrt{0.7}=0.83666$. When a processor used has a word length which can express only two decimal places similarly as described above, INV_Pup=0.83. Thus, Pup(n) ×INV_Pup=1.19×0.83=0.9877 . . . . Since this value is insufficient for correcting the output of the variation detection circuit 32 with respect to the output power, the next detection of a variation value of the wobble amplitude includes an error increased by a factor of 1/0.9877 . . . =1.012 . . . .

The inverse number of Pup(n) is used for INV_Pup; INV_Pup=1/1.19=0.84033 . . . . When a processor used has a word length which can express only two decimal places, INV_Pup=0.84. In this case, Pup(n) ×INV_Pup=1.19×0.84=0.9996 . . . . Thus, the next detection error for a variation value of the wobble amplitude is suppressed by a factor of 1/0.9996 . . . =1.0004. Therefore, each of the values for INV_Pup in the above table is determined by using a value corrected in view of a corresponding value for Pup (n) being rounded down. The values for INV_Pup in the table shown in FIG. 12 are values which have already been subjected to the above correction.

Next, due to the phase delay of the band pass filter 41 provided in the wobble amplitude detector 10, the wobble amplitude detector 10 outputs a signal delayed for a certain time with respect to a signal input from the differential amplifier 20. Thus, the power varied by a factor of Pup(n) reaches the digital signal processing circuit 33 with a delay corresponding to the delay time caused in the wobble amplitude detector 10. At step R5, if the output of the variation detection circuit 32 is multiplied by the previously obtained value for INV_Pup without considering the above delay, the result of $\alpha(n)$ obtained in this operation has an error.

In order to solve this problem, at step R13, INV_Pup is input to the digital filter 35, which is a low pass filter having the same phase delay as that of the band pass filter 41. When correction is actually performed at step R5 as described above, the output of the digital filter 35 is used. After step R13 has been finished, the process returns to step R1, and the above processes are repeated.

Next, each of the above-described processes in FIG. 11 which are performed when the optical beam is present within the data region is described with specific values. First, an operation which is performed when the optical beam is present within a data region where no defect is present is described. Herein, assume that the values stored in the memory 23 are Pk=11 mW, Pb1=5.5 mW, and Pb2=1 mW. The values Ipk=48.9 mA, Ibs1=38.9 mA, and Ibs2=31.6 mA have already been obtained by means of an operation of the emitted light controls section 8, and are output to the recording waveform generation section 13 through the switch 9. Furthermore, η=0.55 mW/mA and Ith=28.9 mA are given. When α(n−1)=1, Pup(n)=1, and INV_Pup=1 are given, the digital filter 35 outputs 1. At step R3, Pup(n−1)=1 is an initial value. Thus, output values are obtained by the following calculations and output to the recording waveform generation section 13 through the switch 9. Furthermore, both β and γ are 1.

$Ipk=Pup(n) \times dIpk+Ith=$ 1×19.9991+28.9= 48.9 mA $Ibs1=Pup(n) \times dIpb1+Ith=$ 1×9.9995+28.9= 38.9 mA $Ibs2=Pup(n) \times dIPb2+Ith=$ 1×2.7278+28.9= 31.6 mA The above value is equal to the value output by means of an operation of the emitted light control section 8. Hereinafter, this value is used as an initial value and is varied when the optical beam is passing over a defect. Herein, since βXγ=1, the set value in the amplifier 34 is changed to 1 at step R4. That is, as a result, the amplification factor is not changed. Since the current position of the optical beam is not present on a defect, the value output from the variation detection circuit 32 is 1, and the value output from the digital filter 35 is 1. Therefore, α(n)=1 is obtained at step R5.

At step R6, similarly to the above-described example, MAXLMT=0.64 is stored. Then, at step R7, the values α(n)=1 and MAXLMT=0.64 are compared. In this case, α(n)>MAXLMT, and therefore, the process proceeds to step R9. Next, when ΔαMIN=−0.2 and ΔαMAX=0.2, ΔαMIN=−0.2<α(n)−α(n−1)=0<ΔαMAX=0.2, and therefore, the process proceeds to step R11.

At step R11 and step R12, Pup(n)=1 and INV_Pup=1 are selected from the table, respectively. Thus, when there is no defect, a value which is equal to the value output by means of the operation of the emitted light control section 8 is output. Next, an operation performed when the optical beam is present over a defect while the above operation state of the apparatus is maintained is described. When the optical beam is present over the defect, the output of the wobble amplitude detector 10 is reduced in comparison to the output of the detector 10 before the optical beam reaches the defect. Assume that this reduction is 30%. In this case, since INV_Pup=1, the output of the digital filter 35 is 1. Therefore, α(n)=0.7 is determined at step R5. Since α(n)=0.7>0.64=MAXLMT at step R7, the process proceeds to step R9.

At step R9, if ΔαMIN=−0.2, α(n)−α(n−1)=0.7−1=−0.3<ΔαMIN=−0.2. Thus, the process proceeds to step R10. At step R10, α(n)=α(n−1)+ΔαMIN=1−0.2=0.8 is obtained. Then, Pup(n)=1.11 is obtained at step R11, and INV_Pup=0.90 is obtained at step R12. Then, the process returns to step R1 via step R13. Thereafter, at step R3, dIpk=19.9991 mA, dIpb1=9.9995 mA, and dIpb2=2.7278 mA, which have been obtained at step RA1, are used to newly output the following values:

$Ipk=Pup(n) \times dIpk+Ith=$ 1.11×19.9991+28.9= 51.099 mA $Ibs1=Pup(n) \times dIpb1+Ith=$ 1.11×9.9995+28.9= 39.999 mA $Ibs2=Pup(n) \times dIPb2+Ith=$ 1.11×2.7278+28.9=31.928 mA.

Even when the output of the wobble amplitude detector 10 is reduced by 30% due to the defect, since the power of the optical beam output is increased by a factor of 1.11, i.e., 0.7×1.11=0.777, it is detected that the output of the variation detection circuit 32 is reduced by about 28%. When the output of the digital filter 35 is stabilized after the above delay time, at step R5, the above increased power is multiplied by the output of the digital filter 35, i.e., (INV_Pup)=0.90, whereby α(n)=0.777×0.90≈0.7 is obtained, again. Thereafter, similar processing is repeated.

In the above processing, the calculations are achieved by using Ith and η, which are obtained by the emitted light control section 8. The three powers, Pk, Pb1, and Pb2, can be controlled with a smaller error according to a variation value for the output of the variation detection circuit 32, independent of a variation in the I-L characteristic of the laser 3.

Thereafter, when the optical beam reaches the head of the header region, the gate generator 15 pulls the write gate signal and the data gate signal to the L level, and the operation of the emitted light control section 8 returns to step A1 in FIG. 10. After it is detected at step R1 in FIG. 11 that the write gate signal is at the L level, the operation of the reflected light control section 12 returns to step R1 again.

Herein, assume that the emitted light control section 8 outputs Ipk=48.9 mA, Ibs1=38.9 mA, and Ibs2=31.6 mA, and as a result, optical beams having powers Pk=11 mW, Pb1=5.5 mW, and Pb2=1.5 mW, respectively, are output from the laser 3. On the other hand, assume that the reflected light control section 12 outputs Ipk=51.09 mA, Ibs1=39.99 mA, and Ibs2=31.93 mA, and as a result, optical beams having powers Pk=12.2 mW, Pb1=6.1 mW, and Pb2=1.66 mW, respectively, are output from the laser 3. When the output of the emitted light control section 8 and the output of the reflected light control section 12 are alternately output through the switch 9, the power output from the laser 3 is different between the case where Pk=11 mW, Pb1=5.5 mW, and Pb2=1.5 mW and the case where Pk=12.2 mW, Pb1=6.1 mW, and Pb2=1.66 mW. In such a case, there is a possibility that data cannot be correctly recorded on the optical disc 1.

However, when the structure described above with reference to FIG. 2 is employed, the emitted light control section 8 operates only in the gap region where no data is to be recorded. Thus, when data is recorded in the data region, the power of the optical beam output from the laser 3 is controlled so as to be optimum on the information recording surface of the optical disc 1 by controlling only the output of the reflected light control section 12. Thus, such control is free from the above problems.

Specifically illustrating, in a DVD-RAM optical disc having a capacity of 2.6 Gbytes on one surface, the time required for an optical beam to pass through the gap region is about 5.5 μs, and the time required for an optical beam to move from the end of the gap region to the head of a header region in the next sector is about 1379 µs. Thus, the optical beam passes over one sector in about 1.4 ms, and only for 5.5 µs within this 1.4 ms (correctly, it is 4.5 µs, i.e., 5.5 µs minus a 1 µs period during when the above values of P1 and P2 are output), Ipk=48.9 mA, Ibs1=38.9 mA, and Ibs2=31.6 mA are output from the emitted light control section 8. In the meantime, the reflected light control section 12 does not output Ipk=51.09 mA, Ibs1=39.99 mA, and Ibs2=31.93 mA. Furthermore, since the emitted light control section 8 does not operate in the data region, even when the emitted light control section 8 and the reflected light control section 12 output different values, only the output of the reflected light control section 12 is selected for the data region. Since a variation in the I-L characteristic is caused by changes in the environment, such as the environmental temperature or the like, the variation in the I-L characteristic is caused in a sufficiently low band in comparison to a variation in the optimum power which is caused due to dirt present on the medium, such as dust, a fingerprint, or the like. Thus, the emitted light control section 8 can be operated at a low frequency at which the optical beam passes over the gap region.

Figure 13:
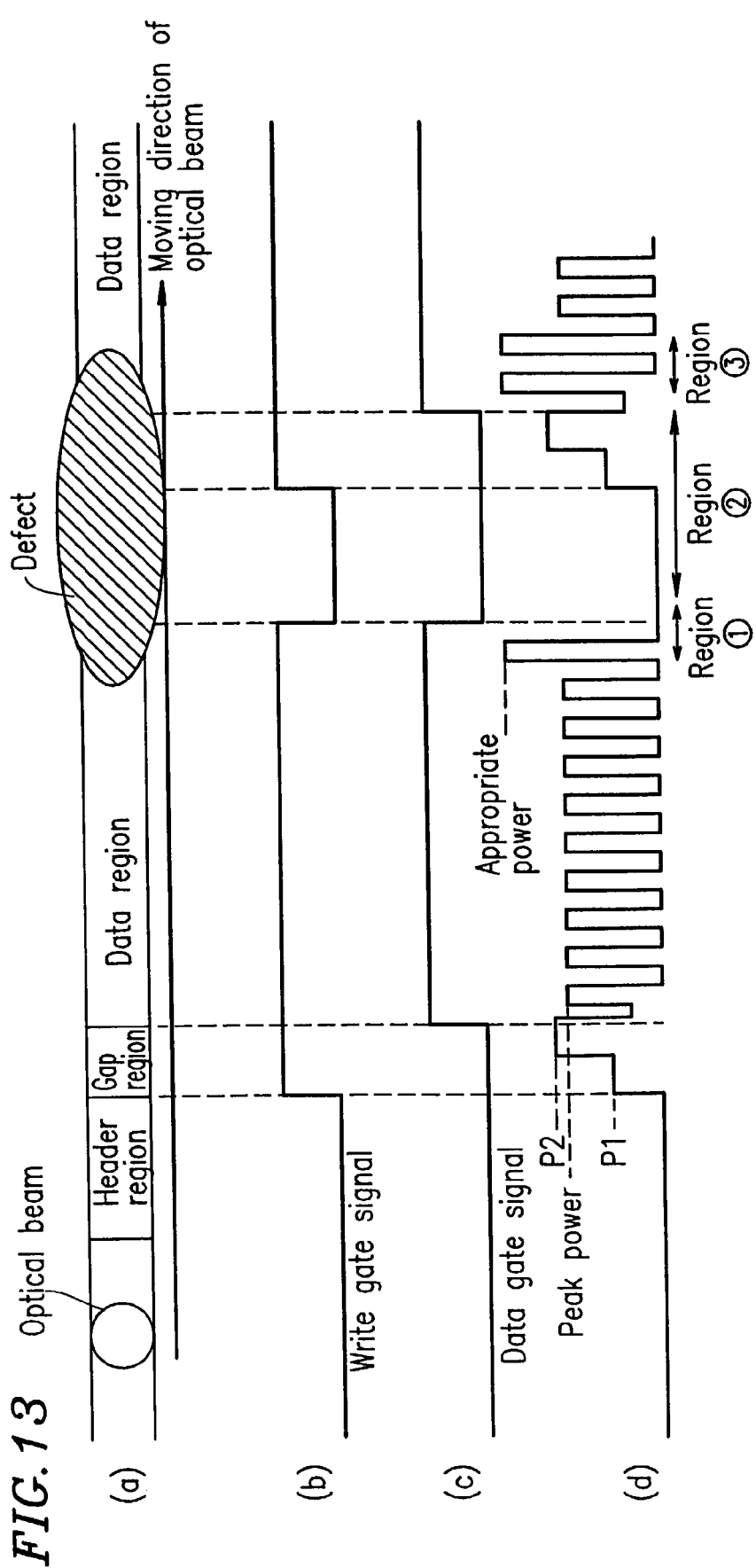
FIG. 13 illustrates a principle of a laser power control method according to the present invention which is employed when a defect is present over two sectors on a track.

Next, an operation performed when a defect is present over two sectors is described. Similarly to FIG. 8(*a*), FIG. 13(*a*) schematically shows transition of an optical beam along a track which is achieved by means of the rotation of the optical disc 1. FIG. 13(*a*) shows a defect which is present over regions including a header region and a gap region. FIGS. 13(*b*) and 13(*c*) show timing charts of a write gate signal and a data gate signal, respectively. FIG. 13(*d*) schematically shows the power of an optical beam when the optical beam passes over the regions shown in FIG. 13(*a*), where the vertical axis represents the power (mW), and the horizontal axis represents the time (s). In time region ④ in FIG. 13(*d*), the wobble amplitude is decreased due to a defect, and then, the reflected light control section 12 is operated so as to increase the output of the optical beam such that an appropriate power is obtained for forming a recording mark. However, when the optical beam is present in the header region, the write gate signal is at the L level, and therefore, the emitted light control section 8 outputs a reproduction power having a value of Pr. In time region ②, the emitted light control section 8 is operated.

In time region ③ where the data gate signal rises to the H level again, if the reflected light control section 12 operates using as an initial value a driving current obtained after the emitted light control section 8 is operated, the time when the power of the optical beam reaches an appropriate power by means of the operation of the reflected light control section 12 is delayed due to the above-described detection delay in the band pass filter 41 and the limitation of ΔαMIN. In order to avoid this problem, the processing of FIG. 11 is structured such that at step R3 in the former part of the flowchart, an operation result is output to the switch 9. That is, the operation result can be output to the switch 9 before the output of the variation detection circuit 32 is input thereto.

Effects of the above structure are described. First, when there is no defect in time region ① in FIG. 13(*d*), value α(n)=1 is obtained, and corresponding value Pup(n)=1 is obtained. In this case, in time region ③, Pup(n−1)=1. Thus, the same operations as those described above at and after step R3 are performed. Alternatively, if a defect is present in time region ① in FIG. 13(*d*), α(n)=1 is not obtained, and accordingly, Pup(n−1)=1 is not obtained. For example, as described above, assume that α(n)=0.7 and Pup(n)=1.11.

When the optical beam moves into time region ② under such a condition, information of Pup(n−1)=1.11 is stored inside the reflected light control section 12 until it is detected at step R2 that the data gate signal rises to the H level. In time region ③, at step R3, Ipk=51.09 mA, Ibs1=39.99 mA, and Ibs2=31.93 mA can immediately be output as initial values by using the information of Pup(n−1)=1.11. Therefore, even when a defect is present over two sectors, an appropriate power can be obtained more quickly.

Next, a function of each component of the optical disc apparatus of FIG. 2 which is carried out when it starts its operation (i.e., at the startup of the optical disc apparatus) will be described in conjunction with the function of the servo microcomputer 17. Thereafter, a function which is carried out when a change in an appropriate power for forming a recording mark is caused in a band lower than that of the low pass filter 31, a function which is carried out when recording of information is performed together with a seeking operation, and a function which is carried out when off-track is caused during recording of information, are described in sequence.

Figure 14:
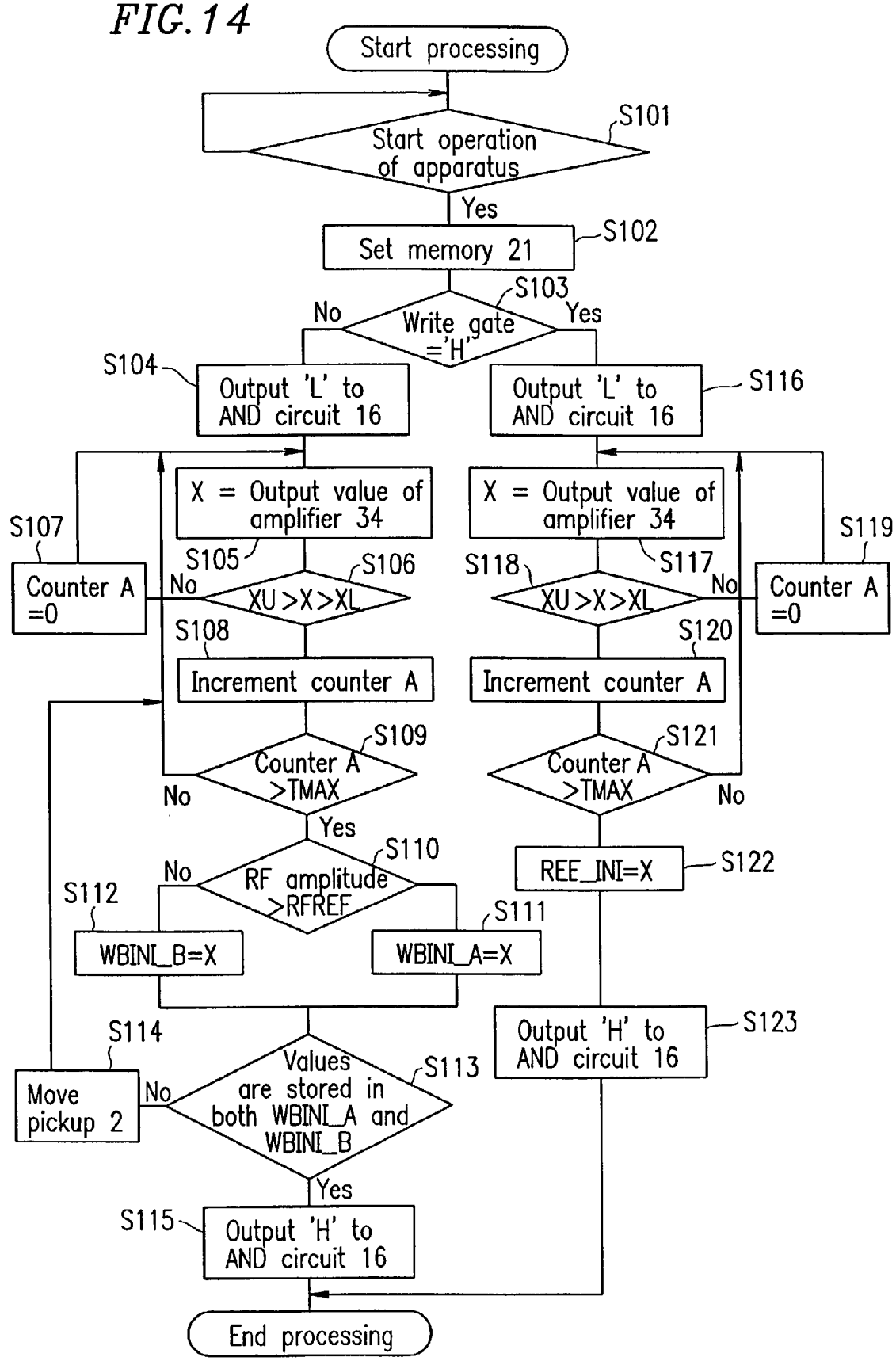
FIG. 14 is a flowchart for illustrating an operation of a servo microcomputer when the optical disc apparatus of FIG. 2 begins to operate.

First, a function performed by the servo microcomputer 17 when the apparatus starts its operation (startup) is described with reference to the flowchart shown in FIG. 14. In FIG. 14, the low pass filter 31 is operated in both a reproduction operation and a recording operation, in order to obtain an initial value for a reference value which is used for detecting a variation in the wobble amplitude in the variation detection circuit 32.

Prior to the processing of FIG. 14, the motor 6 rotates the optical disc 1 at a predetermined rotation speed. The servo microcomputer 17 performs focusing control such that the optical beam is focused on the information recording surface of the optical disc 1, and performs tracking control such that the optical beam follows a track of the optical disc 1.

Now, assume that the pickup 2 is present over a region at an internal circumference of an optical disc in which no effective data is to be recorded and in which a recording operation can be performed for the purpose of adjusting the power of an optical beam or the like (e.g., a "drive test zone" in a DVD-RAM optical disc). In the meantime, the gate generator 15 outputs a write gate signal of the L level, and the switch 9 is connected to the output side of the emitted light control section 8. Since the write gate signal is at the L level, the recording waveform generation section 13 outputs to the driving section 14 the value of Ird which is output through the switch 9. The power of the optical beam output from the laser 3 is the reproduction power Pr.

First, at step S101, whether it is the time to start an operation of the optical disc apparatus is detected. If it is not the time to start the operation of the apparatus, the process returns to step S101, and subsequent processing is not performed until the time to start the operation arrives. If it is detected that it is the time to start the operation of the apparatus, the process proceeds to step S102. At step S102, the values Pk, Pb1, Pb2, and Pr from the servo microcomputer 17 are set in the memory 23. At step S103, the polarity of the write gate signal is detected in a control section.

Processing performed when the write gate signal is at the L level is described. When the write gate signal is at the L level, the process proceeds to step S104. At step S104, the above-described forced outage signal is pulled to the L level and output to the AND circuit 16, such that an error does not occur when an initial output of the low pass filter 31 which has passed through the amplifier 34 is obtained. In this way, the values, Ipk, Ibs1, and Ibs2, which have been obtained by means of the operation of the reflected light control section 12 are prevented from being output through the switch 9.

At the subsequent step, step S105, a signal output from the amplifier 34 is input to the servo microcomputer 17. In the following description, this value is referred to as "X". At the subsequent step, step S106, it is determined whether the value X is within a range defined by predetermined values XU and XL, in order to determine whether a defect is present at a position where the optical beam is currently placed.

The range defined by values XU and XL is a range within which a change of X is permitted when there is no defect and which is expressed by a numeric value, e.g., ±5%. When there is a defect, the wobble amplitude is varied, and as a result, the variation component is input to the low pass filter 31. Since, as described above, the cut-off frequency of the low pass filter 31 is 50 to 100 Hz, and a variation component which is caused due to a defect is a high frequency of several kilohertz to several tens of kilohertz, the output of the low pass filter 31 is not influenced by the defect in an ideal case. However, if a defect is present so as to extend along the circumferential direction of a track for a long time period, an entire variation component caused due to the defect cannot be suppressed in the band of the low pass filter 31, and a portion of the variation caused due to the defect is output.

Thus, when value X of the output which is input from the low pass filter 31 to the servo microcomputer 17 through the amplifier 34 is out of the range defined by XU and XL, ±5%, there is a high possibility that a defect is present at a position irradiated with the optical beam. This means that the output of the amplifier 34 in this time cannot be used as a reference value for detecting a defect. In this case, the process proceeds to step S107, and counter A is reset to 0. Thereafter, the processing at and after step S105 are repeated. If X is within the range defined by XU and XL at step S106, the process proceeds to step S108, and counter A is incremented by 1.

At the subsequent step, step S109, it is determined whether or not the value of counter A is equal to or greater than a value previously set in TMAX. If the value of counter A is equal to or greater than TMAX, it is determined that there was no defect during a period when the output of the amplifier 34 was measured by the servo microcomputer 17, and the process proceeds to step S110. If the value of counter A is smaller than TMAX, the processing at and after step S105 are repeated to measure value X.

Now, assume that TMAX is a time for securing that a value output from the amplifier 34 can be used as a reference value for detecting a defect. If a time period X when the optical beam is passing over several sectors is within the range defined by XU and XL, the measured X can be used as the reference value for detecting a defect. In an actual case, a value obtained by dividing the time spent for the optical beam to pass over several sectors by the time required for counter A to be incremented by 1 is stored in TMAX. For example, when the time spent for the optical beam to pass three sectors is 4.2 ms, and counter A is operated at every 14 $\mu$s, 4200/14=300 is stored in TMAX. If period X represented by TMAX is within the range of ±5%, it is at least determined that the value output from the amplifier 34 was obtained when the optical beam is present within a region where there is no defect. In such a case, the value output from the amplifier 34 can be used as a reference value for detecting the variation in the wobble amplitude. Therefore, the process proceeds to step S110.

At step S110, an RF signal is input, and the amplitude of the RF signal is compared with value RFREF which represents a specific amplitude. The processing herein is performed for determining whether a region where the optical beam was present during measurement of X is a region where data had previously been recorded or a region where no data had previously been recorded. If the region is a region where data had previously been recorded, modulation occurs due to a recording mark in that region, and accordingly, the amplitude of the RF signal is generated. However, if it is a region where no data had previously been recorded, no modulation occurs, and accordingly, the amplitude of the RF signal is not generated. Thus, if the amplitude of the RF signal is greater than a value in RFREF, the period when X was measured corresponds to the region where data was previously recorded. If the amplitude of the RF signal is equal to or smaller than a value in RFREF, the period when X was measured corresponds to the region where no data was previously recorded. When the amplitude of the RF signal is greater than RFREF, it is determined that the period when the above value X was measured corresponds to the region where data was previously recorded, and then, the process proceeds to step S111.

Since there is a recording mark in the region where data was previously recorded, the reflectance in that region is typically lower than that in the region where no data was recorded. Thus, the value for X is smaller than that obtained for the region where no data was recorded. At step S111, the value of X is stored in a memory WBINI_A as an initial value for the wobble amplitude during a reproduction operation when the optical beam is present within a region where data has been previously recorded.

Subsequently, at step S113, it is determined whether values are stored in both WBINI_A and WBINI_B which is a memory for storing value X obtained when the optical beam is present within a region where no data has been recorded. At this time, a value is not stored in WBINI_B, and therefore, the process proceeds to step S114. At step S114, a control signal for performing a seeking operation is output to the pickup 2, so that a position on the optical disc 1 which is irradiated with an optical beam is shifted. Thereafter, the processing at and after step S105 are repeated. At step S110, when the amplitude of the RF signal is equal to or smaller than RFREF, it is determined that X represents the wobble amplitude obtained when the optical beam is present within a region where no data has been recorded. Then, at step S112, X is stored in WBINI_B, and the process proceeds to step S113.

At step S113, values are stored in both WBINI_A and WBINI_B, and therefore, the process proceeds to step S115. At step S115, a forced outage signal of the H level is output to the AND circuit 16, and after an operation of the AND circuit 16 is restored to an operable state by using the polarities of a write gate signal and data gate signal which are obtained during a normal operation, the process is ended. Through the above process, the initial value of the wobble amplitude obtained during a reproduction operation is measured for each of a case where the optical beam is present within a region in which data has previously been recorded and a case where the optical beam is present within a region in which data has not previously been recorded. The obtained initial values are stored in WBINI_A and WBINI_B, respectively. The values stored in WBINI_A and WBINI_B are used for obtaining value $\beta$ which is used for correcting the amplification factor of the amplifier 34 when recording of data is performed together with a seeking operation, which is described later with reference to FIG. 16.

Next, processing of waiting for the output of the low pass filter 31 being stabilized is performed in order to obtain an initial value of a reference value which is used for detecting a variation in the wobble amplitude during an actual recording operation. First, in response to an instruction from the control microcomputer 18 (not shown in FIG. 14), a recording operation is performed. Herein, assume that the optical beam is present within a region where recording of data can be performed, such as the above-described "drive test zone", and the optical beam is ready for recording test data which is actually not to be reproduced after a recording operation on the optical disc 1 has been finished.

Under such conditions, the processing of FIG. 14 is started again. At step S101, it is detected that it is the time to start the operation of the apparatus. At the subsequent step, similarly to step S102, specific values for Pk, Pb1, Pb2, and Pr are set in the memory 23 of the emitted light control section 8. At step S103, the polarity of the write gate signal is detected in a control section, and the flow is branched based on the detected polarity. Since the write gate signal of the H level is output from the gate generator 15 during a recording operation, the process proceeds to step S116.

At step S116, similarly at step S104, a forced outage signal is pulled to the L level and output to the AND circuit 16. The operations from step S116 to step S121 are performed for measuring a value for X which is obtained during a period indicated in TMAX. These operations are the same as those from step S104 to step S109, and therefore, descriptions thereof are omitted.

At the subsequent step, step S122, a measured output X of the amplifier 34 is stored in a memory REF_INI as a reference value for the wobble amplitude during a recording operation. Thereafter, at step S123 the forced outage signal is pulled to the H level and output to the AND circuit 16, and the process is ended.

During the recording operation, it is not necessary to determine whether a region where recording of data is currently performed is a region where data has previously been recorded or a region where data has not previously been recorded. In the case of an optical disc such as a DVD-RAM optical disc or the like, a direct overwrite method is employed where recording of data is performed, while erasing with power Pbs1, data which has been previously recorded in the optical disc 1. Thus, since no difference is caused in the wobble amplitude according to this method, the reflectance is determined based on a recording mark which is currently recorded, regardless of whether data has been recorded or not in that region. Through the above operations, the initial value for the output of the amplifier 34 can be obtained as a reference value for detecting a variation in the wobble amplitude.

Next, a function of the servo microcomputer 17, which is carried out when an appropriate power for forming a recording mark is varied in a band lower than that of the low pass filter 31, is described with reference to the flowchart shown in FIG. 15. In the first place, an objective of this function is briefly described.

In the production of the optical disc 1, non-uniformity in the thickness of a protective film is generated with respect to a recording material, and accordingly, the reflectance and transmittance are varied. When the reflectance and transmittance are varied, an appropriate power which is required for forming a recording mark on the optical disc 1 is varied. Moreover, the wobble amplitude which is generated by receiving an optical beam reflected by the optical disc 1 is also varied. The non-uniformity in the thickness is generated along the radius direction of the optical disc in many cases. Thus, a variation in the appropriate power which is caused due to the non-uniformity in the thickness is not detected when the optical beam is scanning a track for the time period required for the optical disc 1 to make a single turn. Such a variation in the appropriate power is detected through several times of turning of the optical disc. The function described herein is to detect a variation in the appropriate power and change the output of the emitted light control section 8 such that the power of the optical beam output from the laser 3 becomes an appropriate power.

Figure 15:
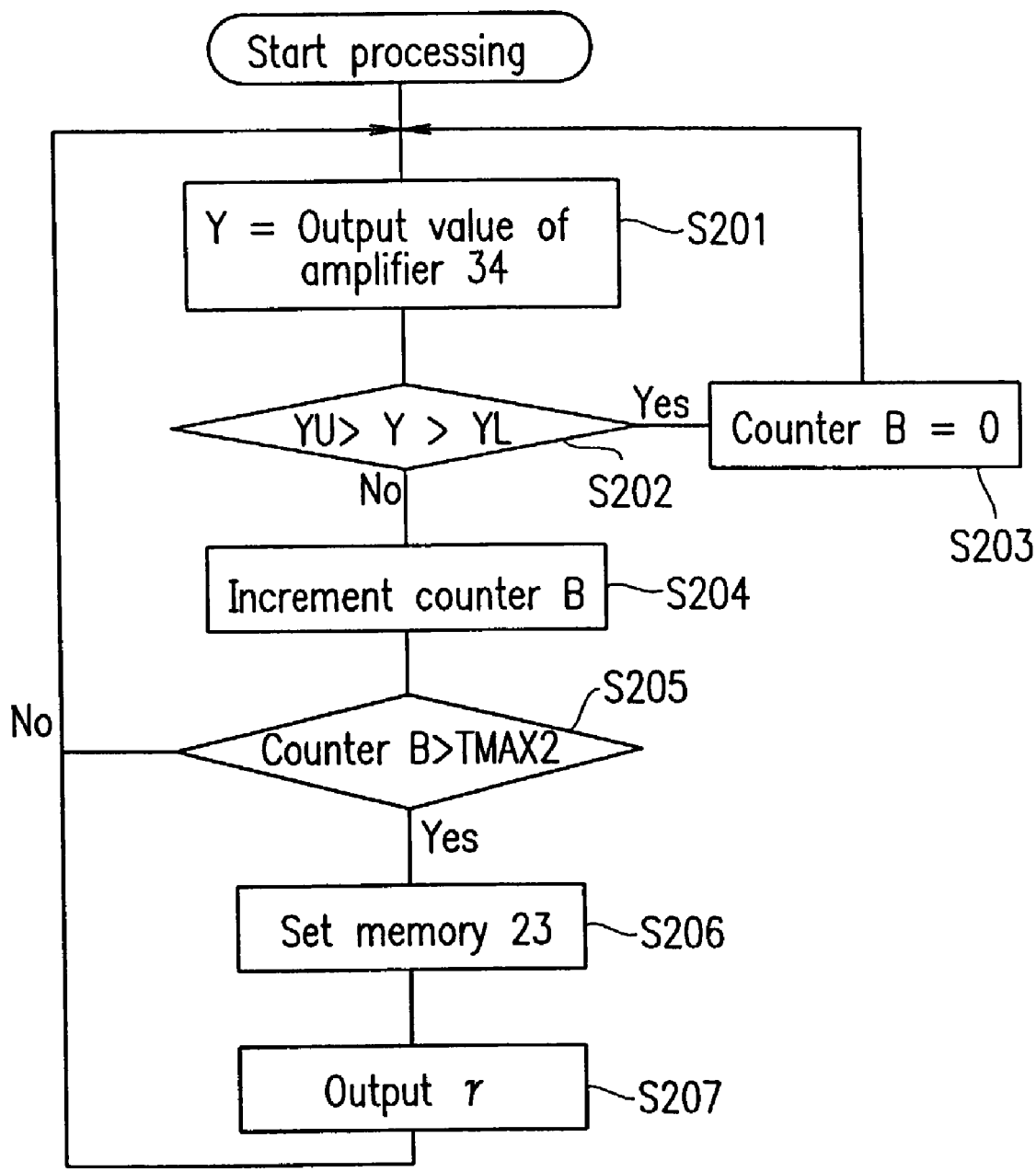
FIG. 15 is a flowchart for illustrating an operation of the servo microcomputer when an appropriate power for the optical disc apparatus of FIG. 2 is changed.

Prior to an operation of FIG. 15, a recording operation is performed. Now, assume that, in this operation, an optical beam is scanning a track on the optical disc 1 by means of rotation of the optical disc 1. The switch 9 alternately selects the output of the emitted light control section 8 (when the optical beam is passing over a gap region) and the output of the reflected light control section 12 (when the optical beam is passing over a data region).

First, at step S201, an output of the amplifier 34, which is a reference value used for detecting a variation in the wobble amplitude, is input to the servo microcomputer 17. This is referred to as value Y. Then, at step S202, it is determined whether or not value Y is within a range defined by predetermined values YU and YL. The range defined by values YU and YL is a range within which a change in the output of the amplifier 34 is permitted during the period when the motor 6 makes a single turn and which is expressed by a numeric value, e.g., about ±10%. The above-described variation of the wobble amplitude in the circumferential direction depends on the rotation frequency of the motor 6, and is recovered after a single turn of the motor 6. When the wobble amplitude is varied in a lower band with respect to this frequency, the wobble amplitude represents the above-described variation in the reflectance or transmittance which is caused due to the non-uniformity in the thickness with respect to a recording material.

When the reflectance or transmittance is varied, an appropriate power for recording information on a medium is varied. Even when the optical disc 1 makes a single turn, if a variation in the wobble amplitude is out of the range defined by YU and YL, i.e., equal to or greater than +10%, there is a possibility that the appropriate power is varied. In such a case, the process proceeds to step S204, and counter B is incremented by 1.

At the subsequent step, step S205, it is determined whether or not a value of counter B is greater than TMAX2 which represents a predetermined time. In TMAX2, a value obtained by dividing the time spent for the motor 6 to make a number of turns (e.g., 1000 turns) by the time required for counter B to be incremented by 1 is stored. For example, when the time spent for the motor 6 to make a single turn is 30 ms, and counter B is operated at every 0.5 ms, 1000×30/0.5=60000 is stored in TMAX2. If the value of counter B is equal to or smaller than TMAX2, the process returns to step S201, and the same process is repeated.

When there is no variation in the appropriate power, the processing of step S202 is repeated for a time period equal to or smaller than time TMAX2, and at some time, it will be finally detected that value Y is within the range defined by values YU and YL. Then, at step S203, counter B is cleared to 0, and the process returns to step S201. Thus, a variation in the appropriate power is never erroneously detected. Alternatively, when the value of counter B is greater than TMAX2 at step S205, it is determined that the appropriate power is varied. The process proceeds to step S206, and the setting of the memory 23 of the emitted light control section 8 is changed.

Specifically, when value Y exceeds YU, the current power is decreased by 1 mW, and when value Y exceeds YL, the current power is increased by 1 mW. For example, in the case where the value of Pk set in the memory 23 is 11 mW, Pk is increased to 12 mW when value Y exceeds YL, and this increased value is set in the memory 23. This applies to Pb1 and Pb2. At the subsequent step, step S207, a value which represents a change from a value previously set in the memory 23 to the changed value in the memory 23, y=12 mW/11 mW=1.09, is output to the digital signal processing circuit 33, and the process returns to step S201. In the later section, γ which is output to the digital signal processing circuit 33 is described in more detail.

In response to the input of γ, the digital signal processing circuit 33 changes the amplification factor of the amplifier 34 with a product of β and γ, which will be described later in conjunction with step R4 in FIG. 11, so as to correct the reference value for the wobble amplitude. At this time, the operations of steps S206 and S207 are repeatedly performed until the value set in the memory 23 becomes the appropriate power value for recording information on the optical disc 1. When value Y is within the range defined by values YU and YL, it is determined that a value currently set in the memory 23 is a value which represents the appropriate power for recording information on the optical disc 1. Then, the process proceeds to step S203, and thereafter, the above processes are repeated. By means of the operation of the above function, the power of an optical beam output from the laser 3 can be changed according to a variation in the appropriate power which cannot be corrected by the operation of the reflected light control section 12.

Next, a function of the servo microcomputer 17 which is carried out when a recording operation is performed together with a seeking operation of moving the pickup 2 to a sector where recording of information is described with reference to the flowchart of FIG. 16. The function carried out when a recording operation is performed together with a seeking operation is a function of calculating and changing the amplification factor of the amplifier 34. This function is provided in order to prevent occurrence of an error in the output of the reflected light control section 12, which may occur because a difference is generated between the wobble amplitudes obtained before and after the seeking operation due to a variation in the above-described wobble amplitude along the radius direction. It cannot be identified whether this difference is caused due to the variation along the radius direction or due to a defect.

Figure 16:
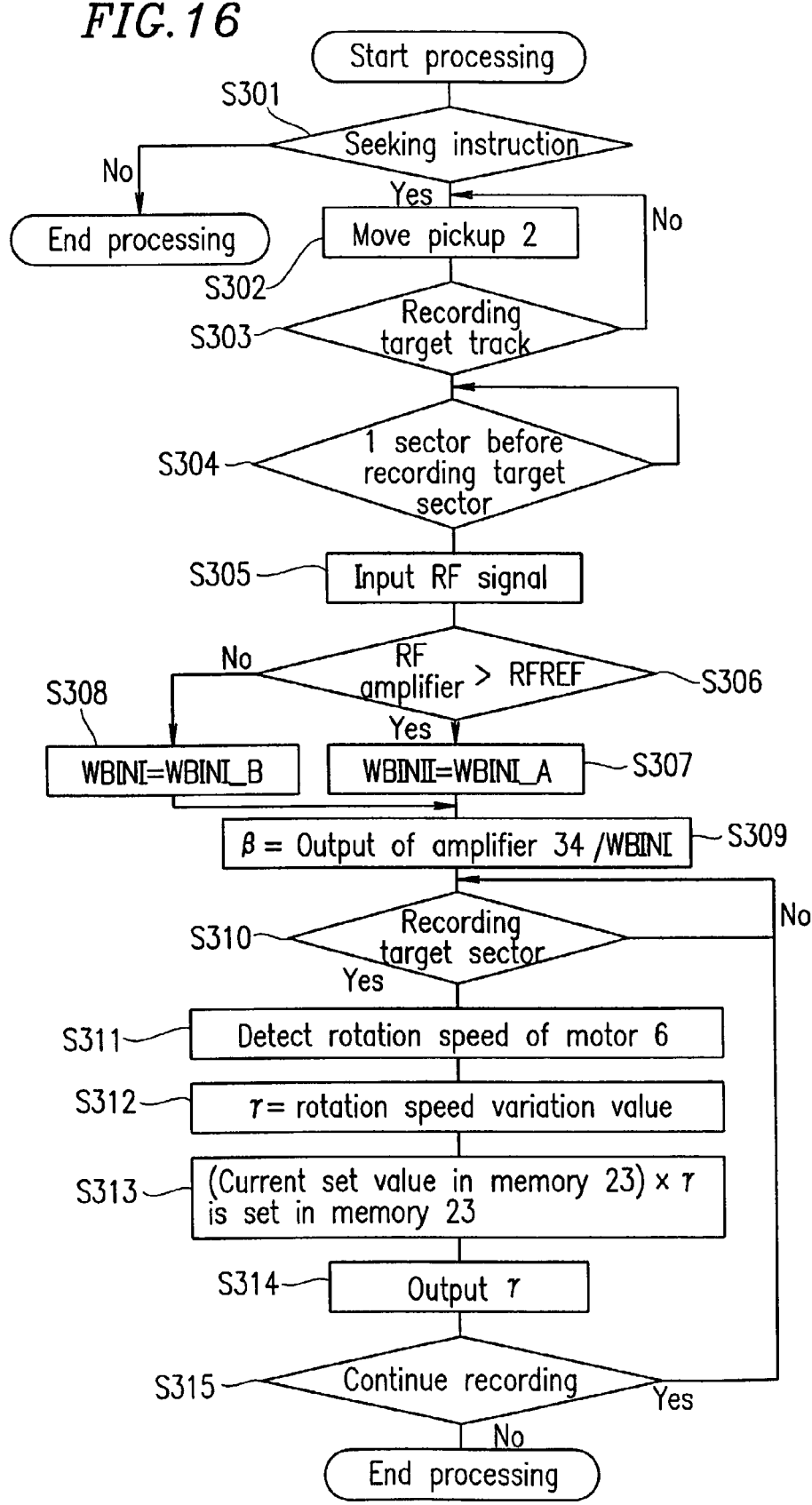
FIG. 16 is a flowchart for illustrating a recording operation of the optical disc apparatus of FIG. 2 which is performed immediately after a seeking operation of the servo microcomputer.

First, assume that a recording operation has been performed once prior to the operation of FIG. 16, data recorded in the optical disc 1 is currently reproduced, and the write gate signal of the L level is output from the gate generator 15. Furthermore, an optical beam output from the laser 3 is controlled by a reproduction power which is represented by a value of Pr. The control microcomputer 18 supplies to the servo microcomputer 17 a seeking instruction and information about a target sector to which the pickup 2 is moved for recording of data. The servo microcomputer 17 receives the seeking instruction at step S301, and the process proceeds to step S302. At step S302, in order to move the pickup 2 to a track including the recording target sector, the digital signal processing circuit 33 outputs a control signal to the pickup 2. At step S303, it is determined based on an address input from the signal processing section 22 whether the track where the optical beam is currently present is a track including the recording target sector.

If the optical beam has not reached the track including the recording target sector, the process returns to step S302, and a control signal is output again in order to move the pickup 2. At step S303, it is confirmed that the optical beam has reached the track including the recording target sector, and thereafter, the process returns to step S304. At step S304, subsequent processing is on standby until the optical beam that is scanning the track reaches a region which is one sector before the recording target sector. After it is confirmed at step S304 that the optical beam reaches the region which is one sector before the recording target sector, the process returns to step S305, and an RF signal is input from the photodetector 5.

At the subsequent step, step S306, it is determined whether the amplitude of the RF signal is greater than the above-described RFREF, and the flow is branched based on a result of the determination. If the amplitude of the RF signal input is greater than RFREF, it is determined that data has been previously recorded in the sector over which the optical beam is currently passing. In this case, at step S307, a value of WBINI_A is stored in memory WBINI, which is used as a reference value for the wobble amplitude in a reproduction operation. If the amplitude of the RF signal input is equal to or smaller than RFREF, it is determined that data has not been previously recorded in the sector over which the optical beam is currently passing. In this case, at step S308, a value of WBINI_B is stored in memory WBINI. After step S307 or step S308, the process proceeds to step S309. At step S309, the output of the amplifier 34 is input, and value β is obtained based on the following expression and output to the digital signal processing circuit 33:

$$\beta = (\text{output of amplifier } 34) \div \text{WBINI}$$

For example, when the value of WBINI is 100 mV, and the output of the amplifier 34 during the current reproduction operation is 80 mV, β=80/100=0.8. This value of β represents a difference of the wobble amplitudes obtained before and after the seeking operation, and hence represents a correction value for the amplification factor of the amplifier 34 which is used in the next sector, i.e., the recording target sector. Thereafter, the process is on standby at step 310 until the recording target sector is reached by the optical beam.

Figure 17:
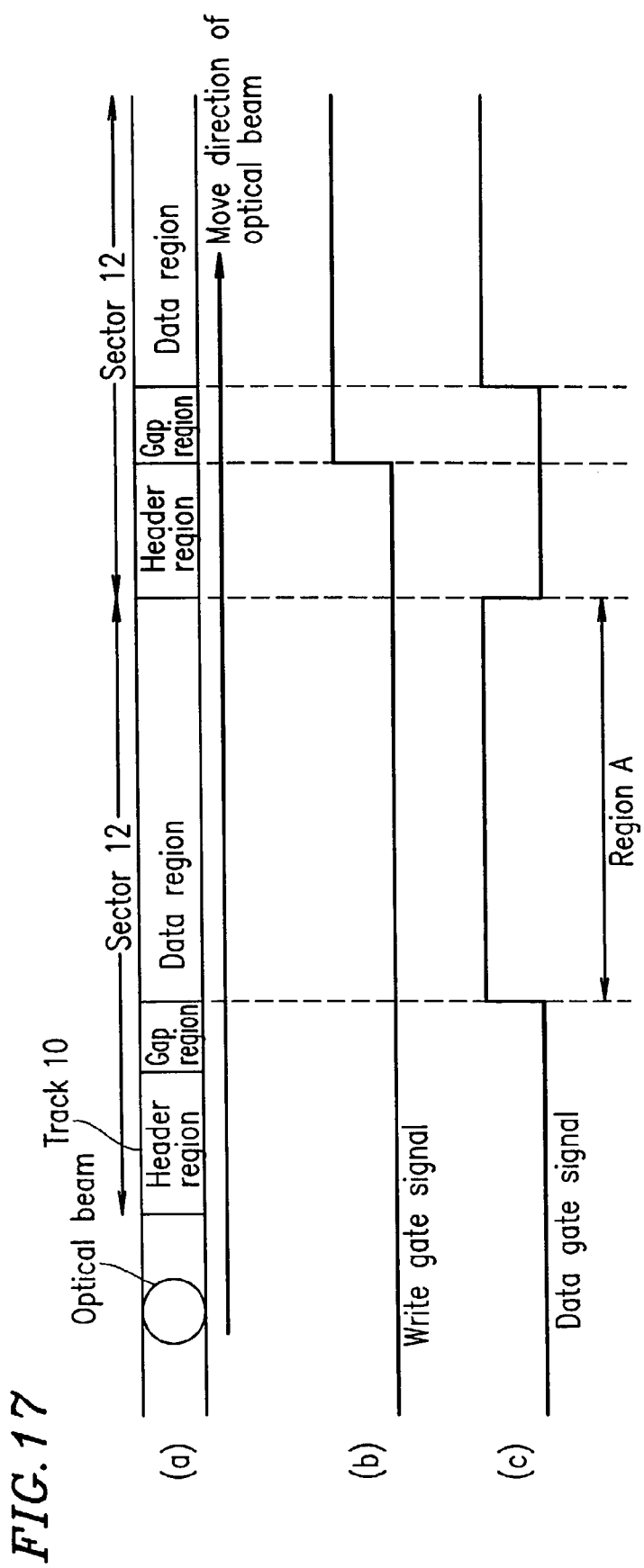
FIG. 17 illustrates an operation of the servo microcomputer during the seeking operation in the optical disc apparatus of FIG. 2.

In a similar manner to FIG. 8(a), FIG. 17(a) schematically shows a transition of an optical beam along a track which is achieved by means of rotation of the optical disc 1. Similarly, FIGS. 17(b) and 17(c) show timing charts for a write gate signal and a data gate signal, respectively. In the case where the optical beam is present in a sector which is one sector before the recording target sector, when the write gate signal is at the L level as shown in FIG. 17(b), the data gate signal is at the H level as shown in FIG. 17(c). In this region, region A, the above operation is performed. Since the write gate signal is at the L level in region A, the emitted light control section 8 is operated, so that the power of the optical beam output from the laser 3 is at a power suitable for reproduction, represented by a value of Pr.

A value of the wobble amplitude in a sector in which reproduction of data is performed, and which is one sector before a sector where data is to be recorded, is used to obtain a value of β, and the output of the amplifier 34 which is obtained at the start of a recording operation is corrected. In this way, power control can be achieved with a small error, as achieved in a recording operation performed while an optical beam is scanning consecutive tracks. Next, an operation performed when the optical beam reaches the recording target sector is described.

In an optical disc which is rotated according to the ZCLV method, such as a DVD-RAM optical disc, it is necessary to change the rotation speed of the optical disc such that the linear velocity at which an optical beam moves from zone to zone becomes constant. Thus, when a distance from a zone where the optical beam is currently scanning to a boundary of the zone is examined, it is necessary to change the rotation speed of the optical disc 1.

Herein, an appropriate power for recording the optical disc 1 varies according to the linear velocity at which the pickup 2 moves. The values set in the memory 23, Pk, Pb1, and Pb2, are obtained when a prescribed linear velocity is achieved. Thus, in order to perform recording of data using values Pk, Pb1, and Pb2 which are set immediately after the seeking operation, it is necessary to keep the recording operation on standby until a operation of the motor 6 after the rotation speed is switched is stabilized, and the rotation speed of the optical disc reaches a target speed. However, this waiting time provided until the rotation speed reaches a prescribed speed may deteriorate the access performance of the apparatus. Thus, in order to avoid such possibility, before the rotation speed is stabilized at the prescribed speed, the recording operation is performed while changing the power for recording data according to the varying rotation speed. In the processing described below, value $\gamma$, which is a variation value of the changed power and which is a variation value of the amplification factor of the amplifier 34, is obtained. At step S311, an operation of detecting the rotation speed of the motor 6 is performed. At the subsequent step, step S312, processing of obtaining the variation value $\gamma$ from a variation in the rotation speed with respect to the prescribed rotation speed is performed. Herein, for the simplicity of description, consider a case where there is a relationship such that the power is changed by 1% with respect to 1% of rotation speed variation. In this case:

$\gamma$=value representing the rotation speed variation of motor 6

Hereinafter, descriptions are made with an example where recording of data is performed while decreasing the rotation speed of the motor 6 by units of 5% in a stepwise fashion and, at the start of the recording operation, the rotation speed is 20% greater than the prescribed rotation speed. In this example, an initial value of $\gamma$ is 1.2. At the subsequent step, step S313, a value obtained by multiplying a currently-set value in the memory 23 by $\gamma$=1.2 is set in the memory 23 again. That is, when value Pk=11 mW is applied to the above calculation, Pk=11×1.2=13.2 mW, which is set in the memory 23. (This applies to Pb1 and Pb2, similarly and a description thereof is omitted.)

Since the value set in the memory 23 is changed, the power of the optical beam which is reflected by the optical disc 1 is changed, and accordingly, the wobble amplitude is varied. Thus, at step S314, the output of the amplifier 34 is corrected. That is, correction value $\gamma$=1.2 is output to the digital signal processing circuit 33. The digital signal processing circuit 33 receives $\beta$=0.8 and $\gamma$=1.2, and changes the amplification factor with a product of $\beta$ and $\gamma$, 0.8×1.2=0.96, (obtained at step R4 of FIG. 11), whereby the reference value for the wobble amplitude is corrected. If the output of the amplifier 34 obtained in a recording operation performed before the current recording operation is 1 V, 1×0.96=960 mV is used as the reference value in the current recording operation.

At the subsequent step, step S315, it is determined whether or not the recording operation is to be continued. If the recording operation is to be continued, the process returns to step S310, and the processing for recording of data is performed again. Then, the rotation speed of the motor 6 is decreased by 5%. As a result, $\gamma$=0.95, and the power represented by a value set in the memory 23 is Pk=13.2×0.95=12.54 mW. At this point, the recording operation is continuously performed, and $\beta$=1. Thus, at step R4, the amplification factor is changed by a factor of $\beta \times \gamma$=0.95. That is, the obtained value, 960 mV×0.95=912 mV, is used as a reference value for the next recording operation. Thereafter, similarly the rotation speed is decreased by units of 5% in a stepwise fashion. When the rotation speed reaches the prescribed speed, $\gamma$=1. By performing the above processing, a control error, which may be caused due to a variation in the wobble amplitude along the radius direction, can be reduced without deteriorating the access performance.

Lastly, a function of the servo microcomputer 17 which is carried out when off-track is caused due to a defect during a recording operation is described. As described above, the wobble amplitude detector 10 detects a wobble amplitude by using an output of the photodetector 5. The output of the photodetector 5 is, on the other hand, input to the servo microcomputer 17 as a tracking error signal so as to perform tracking control.

When an optical beam passes over a defect, the wobble amplitude is varied, but the tracking error signal is also varied. Due to this variation, there is a possibility that the optical beam goes off the track (off-track) that is currently being scanned. When off-track occurs during recording of data, data in a track adjacent to the track in which recording of data is currently performed can be erroneously erased or erroneously overwritten. Thus, in the processing described below, the value set in the memory 23 is changed when off-track occurs, such that the power of the optical beam is decreased from the recording power to a power which is equal to or smaller than the erasing power, whereby occurrence of the above problem is prevented. Thereafter, when the operation recovers from the off-track, the power is increased to the previously-employed recording power.

Figure 18:
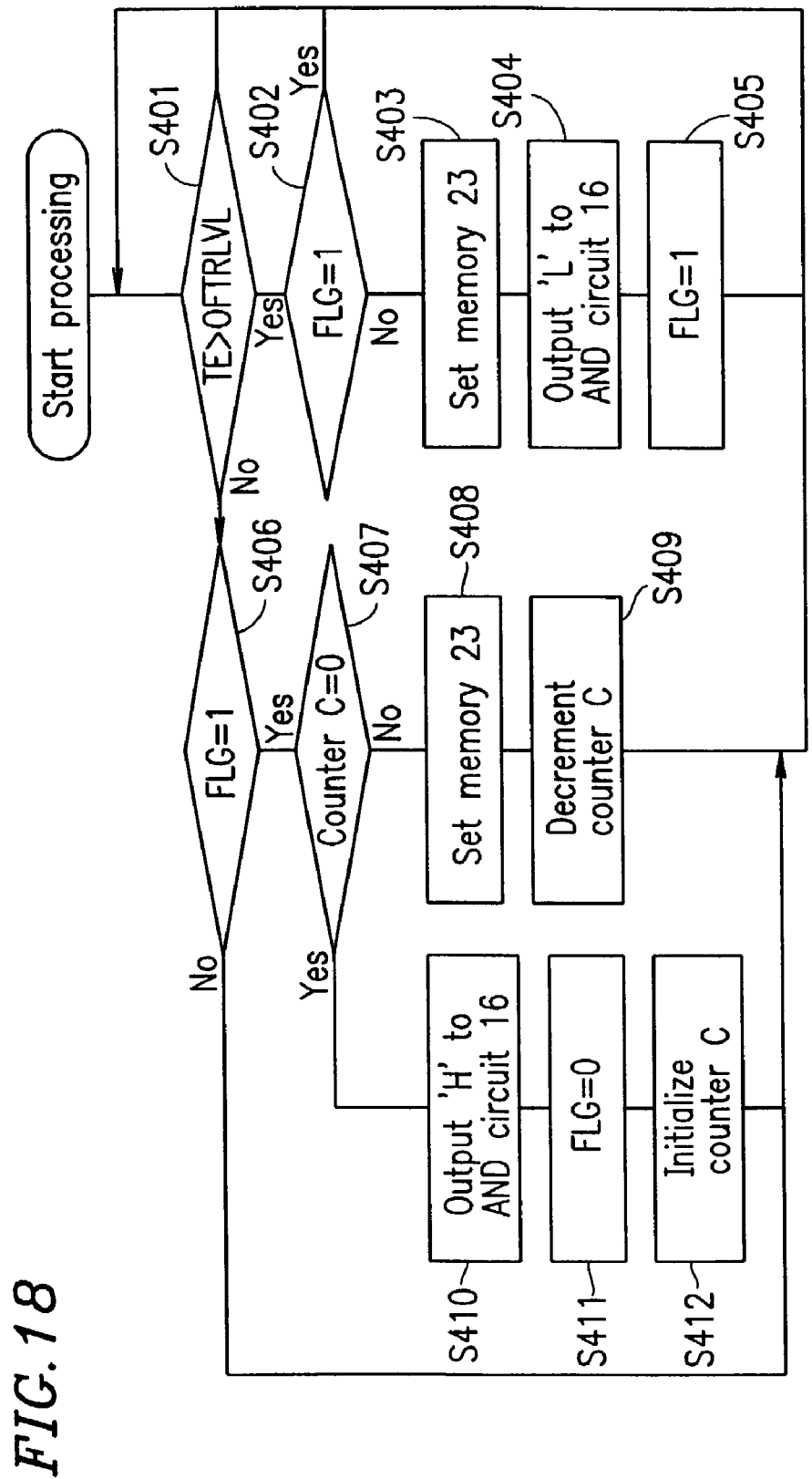
FIG. 18 is a flowchart illustrating an operation of the servo microcomputer when off-track is caused in the optical disc apparatus of FIG. 2.

The flowchart of FIG. 18 illustrates a function of the servo microcomputer 17 which is carried out when off-track is detected. Hereinafter, an operation of the function is described in detail. First, assume that, prior to the operation of FIG. 18, a recording operation is currently performed, while an optical beam is scanning a track on the optical disc 1 by means of rotation of the optical disc 1. The switch 9 alternately selects the output of the emitted light control section 8 (when the optical beam is passing over a gap region) and the output of the reflected light control section 12 (when the optical beam is passing over a data region). First, at step S401, it is determined whether or not the output level of a tracking error signal input is greater than a predetermined value OFTRLVL. If the output level of the tracking error signal is greater than OFTRLVL, it is determined that off-track occurred, and the process proceeds to step S402.

At step S402, it is determined whether flag FLG, which indicates that the power has been previously changed because of the off-track, is 1 or not. When off-track is detected for the first time, flag FLG is 0. Thus, the process proceeds to step S403. At step S403, the value of Pk which is currently set in the memory 23 is replaced with a value which is equal to or smaller than Pb1. Accordingly, the values for Pb1 and Pb2 are decreased and set in the memory 23 again. At the subsequent step, step S404, in order to prevent malfunctioning of the reflected light control section 12, which may caused due to the change in the power of the optical beam output from the laser 3, a forced outage signal is pulled to the L level and output to the AND circuit 16. By the above processing, the power of the optical beam, which is output from the laser 3 by means of the operation of the emitted light control section 8, is decreased so as to be equal to or smaller than the erasing power.

At the subsequent step, step S405, FLG is set to 1. Subsequently, the process returns to step S401, and the subsequent processing are performed. Since FLG is 1 at step S402, the process returns to step S401. The above processing is repeated as long as the off-track exists. When the tracking control recovers from the off-track condition, it is detected at step S401 that the output level of the tracking error signal is equal to or smaller than the value of OFTRLVL, and the process proceeds to step S406.

At step S406, it is determined whether FLG is 1 or not. At this point, after recovery from the first off-track, FLG=1, and the process proceeds to step S407. At step S407, it is determined whether the value of counter C is 0 or not. The value of counter C indicates the time which elapses from recovery from the off-track to the start of an operation of the reflected light control section 12. Hence, the value of counter C indicates the waiting time provided after recovery from the off-track until the output of the low pass filter 33, which was varied due to the power variation, becomes equal to the previously employed power.

In an example where this waiting time is 2 ms, and the time required to decrement counter C by 1 is 14 $\mu$s, the value of counter C is 20000/14=1429. Now, since an initial value input, 1429, is not 0, the process proceeds to step S408. The value set in the memory 23 is returned to a value used before it was changed at step S403. Thereafter, the value of counter C is decremented by 1 at step S409, and the process returns to step S401. The above processing is repeated until counter C is decremented to 0 at step S409.

After 2 ms has elapsed, and it has been detected at step S407 that counter C is 0, the forced outage signal is pulled to the H level and output at step S410, so that the operation of the AND circuit 16 is restored to a normal operation. Subsequently, at step S411, FLG is returned to 0. Thereafter, at step S412, the value of counter C is initialized to 1429, and the process returns to step S401. By performing the above processing, the power can be changed only during a period when off-track occurs. Therefore, erroneous erasure and erroneous recording in adjacent tracks can be prevented.

In the above description, the operations of the digital signal processing circuit 24, the digital signal processing circuit 33, and the servo microcomputer 17 are achieved in separate components. However, it is apparent that these operations can be achieved by using a single processor. Furthermore, since the output of the band pass filter 41 is generally used as a wobble signal for controlling rotation of the motor 6, it is not necessary to make a substantial modification to the structure of an existing apparatus in order to perform the above-described operations. Thus, an apparatus of the present invention can be realized without a substantial increase in the cost.

In an embodiment of the present invention, the wobble amplitude is employed as a signal obtained by detecting light reflected from an optical disc. However, it is apparent that the present invention can be realized by using any signal output in response to light reception by the photodetector 5 (e.g., RF signal).

INDUSTRIAL APPLICABILITY

According to the present invention, a variation in a laser power which is caused due to a variation in the I-L characteristic of a laser that results from a change in the environmental temperature is corrected using control means for emitted light, and a power loss which is caused due to a defect present on an optical disc is corrected using control means for reflected light. These control means are operated not simultaneously but alternately. With such an arrangement, when controlling a plurality of levels of powers which are switched at a high speed, a laser driving current which provides an optimum level of laser power on an information recording surface of a recording medium can be obtained with high accuracy, and the laser power can be controlled in a more secure manner, in comparison to a conventional laser power control method.

According to the present invention, before the control means for reflected light is operated in response to a variation caused in reflected light due to a variation in the track width and non-uniformity in the edge, which are generated in the production of the medium, regardless of appropriate powers for recording/reproducing data on a medium, a variation value for an output of a light receiving element, which may be caused due to such a variation, is previously stored. Then, when the control means for reflected light is operated, a reference value used for detecting a variation in the reflected light is corrected according to the stored variation value. With such an arrangement, an operation of the control means for reflected light is prevented from being triggered by a factor other than a variation in the appropriate power during a recording/reproduction operation which may be caused due to dirt or a fingerprint, for example, a variation in the reflectance of the medium.

According to the present invention, a specific current value for clipping the maximum value that can be output by the laser is previously obtained, and when the variation in the reflected light is large, the driving current for the laser is clipped with the specific current value. With such an arrangement, breakage of the laser due to driving with an excess current can be prevented without stopping the laser output.

According to the present invention, when it is detected that a position irradiated with an output of the laser deviates from a place where information is to be recorded (off-track) during recording of information on a medium, the power of the optical output emitted from the laser is decreased so as to be equal to or smaller than the data erasing power. Then, when it is detected that the position irradiated with the output of the laser has been returned to the place where information is to be recorded, the power of the optical output emitted from the laser is changed to a power which had been employed before the power was decreased. With such an arrangement, even when the position irradiated with the optical output is shifted due to a fingerprint or dirt, erroneous recording or erroneous erasure does not occur in adjacent information recording regions.

What is claimed is:

1. A method for controlling an output power of a laser which is used for recording information on a recording medium, comprising steps of:
   detecting emitted light of the laser by a first detection section;
   obtaining a first driving current of the laser by a first control section based on an output of the first detection section;
   detecting reflected light or transmitted light from the recording medium by a second detection section; and
   obtaining a second driving current of the laser by a second control section based on an output of the second detection section,
   wherein the laser is driven based on the first driving current or the second driving current while the first control section and the second control section are operated alternately such that the second control section does not operate when the first control section is operating, and the first control section does not operate when the second control section is operating, and information is recorded on the recording medium while the second control section is operating.

2. A laser power control method according to claim 1, wherein the first control section operates when reproduction information data is not recorded or reproduced.

3. A laser power control method according to claim 2, wherein: in the recording medium, a region where data is to be recorded is divided into sectors; and when a laser irradiation position is within a gap region where recording/reproduction of data is not to be performed within the sectors, the first control section operates.

4. A laser power control method according to claim 3, wherein: the first control section performs a calculation for obtaining an I-L characteristic which represents a relationship between a driving current and an optical output of the laser; and the first driving current is obtained based on the I-L characteristic.

5. A laser power control method according to claim 4, further comprising a step of obtaining the second driving current based on an output of the second detection section, the I-L characteristic obtained by the first control section, and appropriate laser power stored in an apparatus by the second control section.

6. A laser power control method according to claim 3, wherein when the laser irradiation position is within the gap region, the laser performs test emission while changing the power at a low speed, in comparison to emission performed while changing the power at a high speed which is suitable for recording of data.

7. A laser power control method according to claim 1, wherein when the first control section operates after the second control section has operated, and then the second control section is operated again, the second control section operates based on an output of the second detection section which was obtained immediately before the operation of the previously-operated first control section.

8. A laser power control method according to claim 1, wherein: an operation of the second control section is stopped in a region where it is previously known that no defect exists; and the second control section uses an output of the second detection section obtained when the first control section is operated as a reference so as to drive the laser according to an output variation in the second detection section with respect to the reference.

9. A laser power control method according to claim 8, wherein: a movement section for moving a laser irradiation position on the recording medium is used; an operation of the second control section is stopped when the laser irradiation position is moved by the movement section; an output of the second detection section obtained when the first control section is operated is obtained again as a reference; and the second control section is operated after the reference has been obtained.

10. A laser power control method according to claim 9, wherein, when the reference is obtained again, a value obtained from the output of the second detection section which is output after the laser irradiation position is moved by the movement section and before the laser irradiation position reaches a recording target position, is obtained as the reference.

11. A laser power control method according to claim 8, wherein an output of the first control section is changed when a speed at which emitted light of the laser scans the recording medium is varied, a reference is changed based on the varied value.

12. A laser power control method according to claim 1, wherein: the recording medium is a body of revolution; a varied value for the output of the second detection section is maintained to be the same value even after the time required for rotation of the recording medium or more has elapsed; and if the value exceeds a predetermined value, the output of the first control section is changed such that the output of the second detection section is within a range defined by the predetermined value.

13. A laser power control method according to claim 1, wherein: when a laser irradiation position on the recording medium is shifted from a recording position, the control section changes an output of the laser so as to be equal to or smaller than a power appropriate for erasing data; when the laser irradiation position returns to the recording position, an output of the laser Is changed to a previously-employed output.

14. A laser power control method, comprising steps of:
detecting reflected light or transmitted light from a recording medium by a detection section;
driving a laser by a control section based on an output of the detection section; and
correcting the output of the detection section by delaying for a time necessary to detect the reflected light or the transmitted light from the recording medium by the detection section at a rate inversely related to a variation rate for an output of the control section.

15. A laser power control method according to claim 14, wherein the start of correction is delayed by utilizing a phase delay characteristic of a low pass filter.

16. A laser power control method according to claim 14, wherein: table data including a plurality of output values of the control section that are identified by addresses, which are corresponding output values of the detection section, is employed; the control section selects data which is identified by an address in the vicinity of an output value of the detection section and outputs the selected data; an output of the detection section which is output when an emission limit of the laser is exceeded is previously calculated as a maximum output value before the control section is operated; the address corresponding to the maximum output value is used as a selectable maximum address; and when data which is selected when the control section is operated is an address equal to or greater than the maximum address, the output of the control section is clipped with data represented by the maximum address.

17. A laser power control method according to claim 16, wherein: the table data includes first table data which corresponds to the output of the control section and second table data which represents a correction to the output of the detection section; and the second table data is formed by corrected values with respect to an output error generated by rounding because of a limited word length of the first table data.

18. A laser power control method according to claim 14, wherein: when a laser irradiation position on the recording medium is shifted from a recording position, the control section changes an output of the laser so as to be equal to or smaller than a power appropriate for erasing data; when the laser irradiation position returns to the recording position, an output of the laser is changed to a previously-employed output.

19. An optical disc apparatus for recording/reproducing information on an optical disc by using a laser, comprising:

a first detection section for detecting emitted light of the laser;

a first control section for obtaining a first driving current of the laser based on an output of the first detection section, and outputting the obtained first driving current;

a second detection section for detecting reflected light or transmitted light from the optical disc;

a second control section for obtaining a second driving current of the laser based on an output of the second detection section, and outputting the obtained second driving current;

a selection section for selecting one of the outputs of the first and second control sections as a driving current for driving the laser; and a driving section for driving the laser based on the selected driving current, wherein information is recorded on the optical disc while the second control section is operating, so that recording of information can be performed with an appropriate laser power.

20. An optical disc apparatus according to claim 19, wherein:

the first control section is structured so as to obtain an I-L characteristic which represents a relationship between a driving current and an optical output of the laser based on the output of the first detection section and outputs the obtained I-L characteristic; and the second control section is structured so as to obtain the second driving current based on the output of the second detection section, the I-L characteristic, and the appropriate laser power stored in the apparatus.

* * * * *

UNITED STATES PATENT AND TRADEMARK OFFICE
CERTIFICATE OF CORRECTION

PATENT NO.    : 6,950,378 B1
DATED         : September 27, 2005
INVENTOR(S)   : Atsushi Miyazaki et al.

It is certified that error appears in the above-identified patent and that said Letters Patent is hereby corrected as shown below:

Title page,
Item [22], PCT Filed, should read -- July 28, 2000 --.

Column 44,
Line 19, "Is" should read -- is --.

Signed and Sealed this

Fourteenth Day of February, 2006

JON W. DUDAS
*Director of the United States Patent and Trademark Office*